(12) United States Patent
Kashibuchi et al.

(10) Patent No.: US 8,181,108 B2
(45) Date of Patent: May 15, 2012

(54) DEVICE FOR EDITING METADATA OF DIVIDED OBJECT

(75) Inventors: Yoichi Kashibuchi, Tokyo (JP); Hiroshi Kaburagi, Yokohama (JP); Tsutomu Sakaue, Yokohama (JP); Takeshi Namikata, Yokohama (JP); Manabu Takebayashi, Isehara (JP); Reiji Misawa, Tokyo (JP); Osamu Iinuma, Machida (JP); Naoki Ito, Tokyo (JP); Junya Arakawa, Kawasaki (JP); Shinji Sano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 12/427,403

(22) Filed: Apr. 21, 2009
(Under 37 CFR 1.47)

(65) Prior Publication Data
US 2010/0070854 A1      Mar. 18, 2010

(30) Foreign Application Priority Data
May 8, 2008   (JP) ................................. 2008-122561

(51) Int. Cl.
*G06F 17/24*   (2006.01)
*G06F 3/048*   (2006.01)
(52) U.S. Cl. ......................... 715/255; 715/764; 707/913

(58) Field of Classification Search .................. 715/255; 707/913, 915, 917
See application file for complete search history.

(56) References Cited

U.S. PATENT DOCUMENTS

| | | | | |
|---|---|---|---|---|
| 7,826,709 | B2* | 11/2010 | Moriya et al. | 715/202 |
| 7,844,115 | B2* | 11/2010 | Ohwa et al. | 382/190 |
| 2006/0253491 | A1* | 11/2006 | Gokturk et al. | 707/104.1 |
| 2007/0050397 | A1* | 3/2007 | Hokimoto | 707/102 |
| 2007/0258622 | A1* | 11/2007 | Hara | 382/100 |

FOREIGN PATENT DOCUMENTS

| | | |
|---|---|---|
| JP | 11-025113 | 1/1999 |
| JP | 2001-358857 | 12/2001 |
| JP | 2002-055748 | 2/2002 |

* cited by examiner

*Primary Examiner* — Doug Hutton, Jr.
*Assistant Examiner* — Ariel Mercado
(74) *Attorney, Agent, or Firm* — Fitzpatrick, Cella, Harper & Scinto

(57) ABSTRACT

In a system that performs object division of a manuscript and adds metadata, a method is provided which can edit the metadata by an intuitive operation when no appropriate metadata is added or when it is desired that the metadata be increased by adding. An image processing device, which divides an manuscript acquired through an input component into a plurality of objects and adds the metadata, has a user interface for editing the metadata of the objects, and switches, after selecting first and second objects, a retouching method of the metadata in accordance with the contents of the respective metadata of the first object and second object.

10 Claims, 41 Drawing Sheets

BLOCK INFORMATION

| | ATTRIB-UTE | COORDI-NATE X | COORDI-NATE Y | WIDTH W | HEIGHT H | OCR INFORMATION |
|---|---|---|---|---|---|---|
| BLOCK 1 | 1 | X1 | Y1 | W1 | H1 | CONTAINED |
| BLOCK 2 | 3 | X2 | Y2 | W2 | H2 | CONTAINED |
| BLOCK 3 | 2 | X3 | Y3 | W3 | H3 | NOT CONTAINED |
| BLOCK 4 | 1 | X4 | Y4 | W4 | H4 | CONTAINED |
| BLOCK 5 | 3 | X5 | Y5 | W5 | H5 | CONTAINED |
| BLOCK 6 | 2 | X6 | Y6 | W6 | H6 | NOT CONTAINED |

* ATTRIBUTE: 1 TEXT; 2 PHOTOGRAPH; 3 GRAPHICS

FIG.8A

INPUT FILE INFORMATION

| TOTAL NUMBER OF BLOCKS | N (=6) |
|---|---|

FIG.8B

```
<?xml version="1.0"?>
<svg:svg xmlns:svg="http://www.w3.org/2000/svg" xmlns:xlink="http://www.w3.org/1999/xlink" xmlns: r c d
="http://www.canon.com/ns/" r c d" width="606" height="862" viewBOX="0 0 2361 3388">
```
— 1901

```
<svg:image x="0" y="0" width="1240" height="1760"
xlink:href="data:image/jpeg;base64,/9j/2wCEAB8VFxsXExB8GRsjlR8kLK0yLioqLl5DRzhNb2J1c21ibGp7irGWe4OnhGpsmtGcp7a8
xsjGd5TZ6NfA5rHCxr4BlSMjLiguWjjyWr5/bH++vr6+vr6+vr6+vr6+vr6+vr6+vr6+
...
FFABRQB//ZAAA=">
</s v g : image>
```
— 1902

```
<svg:svg x="188" y="284" width="896" height="148" r c d:gType="stringText">
 <svg:text fill="#020202" font-size="150">
  <svg:tspan y="144" x="0 149 299 449 609 750">user</svg:tspan>
 </svg:text>
</svg:svg>
```
— 1903

```
<svg:svg x="188" y="284" width="896" height="148" r c d:gType="vectorText">
 <svg:g fill="#020202">
  <path d=" M123.3,779h1.2c2.4,0 10.7,3.1 10.7,4v12h1.4q1.4,0 3.8,-1q2.4,-1 8.6,-4h1c3.5,0 8,2.8 8,5
230,0.8 -23.6,6 -27,6h-1v3q7.22 7.23230,0.8 -3.2,4 -4,4c-3.1,0 -4.9,-3.4 -6.8,-12.3c-14,-7 -2,-9.4 -3,-11.7
q3.1,2.4 4.1,3.2q0.9,0.8 1.9,0.8c4,0 21,-5.7 21,-7q-2,-5 -2,-9v-1h-3q-3,0 -6,1.1.3q-3,2,1.3 -8.9,3.7
h-3v-1.5230,-0.3 3,-3.5 3.3,-3.5z"/>
 </svg:g>
</svg:svg>
```
— 1904

```
<svg:svg x="193" y="63" width="311" height="205" rcd:gType="vectorLineArt">
 <svg:path fill="none" stroke="#000000" stroke-width="1.0" stroke-linecap="square"
 d="M1724,2367c-5.5,0 -15.2,12.3 -27,34c-8,2.15 -15,17.2 -79.1,24.5c-37,4.4.3 -63.9,10.1 -63.9,14q0.0.3 0.2,0.4c2.2,1.6
2.5,2.1 3,6,4.5
h12c5.7,0 13,6.7 13,12230,10.5 -16.3,23 -30,23q-4,0 -6.6,-1.5q-2.7,-1.5 -12.4,-10.5q-7,4 -9.5,4c-4,2,0 -12.3,-6.6 -12.3,-10
v-3.5230,-22.1 30,5,-49.5 55,-49.5q2,3,0 41,1.6q5,0.2 13.5,2.4q3.5,0 8.5,-2c23,2,0 54,27.9 54,49q0,4 -0.5,4.4
q-6.1,-4.8 -16.1,-24c-6.5,-12.5 -15.6,-21 -22.5,-21h-66v0z"/>
 ...
</svg:svg>
</svg:svg>
```

FIG.19

```
<id>1</id>
<attribute>PHOTOGRAPH</attribute>
<width>W1</width>
<height>H1</height>
<job>PDL</job>
<user>USER1</user>
<place>F CORP. GTH FLOOR</place>
<time>2007/03/19 17:09</time>
<caption>SINGLE-LENS REFLEX CAMERA</caption>
```

```
<id>4</id>
<attribute>TEXT</attribute>
<width>W4</width>
<height>H4</height>
<job>PDL</job>
<user>USER1</user>
<place>F CORP. GTH FLOOR</place>
<time>2007/03/19 17:09</time>
<caption>COMBINE GOOD PORTABILITY AND HIGH
IMAGE QUALITY. SMALL BUT SUFFICIENT
IN ABILITY
</caption>
```

```
<id>2</id>
<attribute>TEXT</attribute>
<width>W2</width>
<height>H2</height>
<job>PDL</job>
<user>USER1</user>
<place>F CORP. GTH FLOOR</place>
<time>2007/03/19 17:09</time>
<caption>SINGLE-LENS REFLEX CAMERA</caption>
```

```
<id>5</id>
<attribute>PHOTOGRAPH</attribute>
<width>W5</width>
<height>H5</height>
<job>PDL</job>
<user>USER1</user>
<place>F CORP. GTH FLOOR</place>
<time>2007/03/19 17:09</time>
<caption>COMPACT CAMERA</caption>
```

```
<id>3</id>
<attribute>TEXT</attribute>
<width>W3</width>
<height>H3</height>
<job>PDL</job>
<user>USER1</user>
<place>F CORP. GTH FLOOR</place>
<time>2007/03/19 17:09</time>
<caption>RICH GRADATION AND HIGH SATURATION
COLOR REPRODUCIBILITY. CAN MEET DEMAND FOR
HIGH IMAGE QUALITY
</caption>
```

```
<id>6</id>
<attribute>TEXT</attribute>
<width>W6</width>
<height>H6</height>
<job>PDL</job>
<user>USER1</user>
<place>F CORP. GTH FLOOR</place>
<time>2007/03/19 17:09</time>
<caption>COMPACT CAMERA</caption>
```

```
<id>1</id>
<attribute>PHOTOGRAPH</attribute>
<width>W1</width>
<height>H1</height>
<job>PDL</job>
<user>USER1</user>
<place>F CORP. GTH FLOOR</place>
<time>2007/03/19 17:09</time>
<caption>SINGLE-LENS REFLEX CAMERA</caption>
<caption>RICH GRADATION AND HIGH SATURATION COLOR REPRODUCIBILITY. CAN MEET DEMAND FOR HIGH IMAGE QUALITY
</caption>
```

```
<id>2</id>
<attribute>TEXT</attribute>
<width>W2</width>
<height>H2</height>
<job>PDL</job>
<user>USER1</user>
<place>F CORP. GTH FLOOR</place>
<time>2007/03/19 17:09</time>
<caption>SINGLE-LENS REFLEX CAMERA</caption>
<caption>RICH GRADATION AND HIGH SATURATION COLOR REPRODUCIBILITY. CAN MEET DEMAND FOR HIGH IMAGE QUALITY
</caption>
```

```
<id>6</id>
<attribute>TEXT</attribute>
<width>W6</width>
<height>H6</height>
<job>PDL</job>
<user>USER1</user>
<place>F CORP. GTH FLOOR</place>
<time>2007/03/19 17:09</time>
<caption>COMPACT CAMERA</caption>
<caption>COMBINE GOOD PORTABILITY AND HIGH
IMAGE QUALITY. SMALL BUT SUFFICIENT
IN ABILITY
</caption>
```

```
<id>5</id>
<attribute>PHOTOGRAPH</attribute>
<width>W5</width>
<height>H5</height>
<job>PDL</job>
<user>USER1</user>
<place>F CORP. GTH FLOOR</place>
<time>2007/03/19 17:09</time>
<caption>COMPACT CAMERA</caption>
<link>ADDRESS1</link>
```

FIG.34

```
<id>7</id>
<attribute>TEXT</attribute>
<width>W7</width>
<height>H7</height>
<job>PDL</job>
<user>USER2</user>
<place>F CORP. GTH FLOOR</place>
<time>2007/03/19 17:09</time>
<caption>PUT ON SALE!</caption>
```
~ 3801

```
<id>8</id>
<attribute>PHOTOGRAPH</attribute>
<width>W8</width>
<height>H8</height>
<job>PDL</job>
<user>USER2</user>
<place>F CORP. GTH FLOOR</place>
<time>2007/03/19 17:09</time>
<caption>DIGITAL SINGLE-LENS REFLEX CAMERA
</caption>
```
~ 3802

```
<id>9</id>
<attribute>TEXT</attribute>
<width>W9</width>
<height>H9</height>
<job>PDL</job>
<user>USER2</user>
<place>F CORP. GTH FLOOR</place>
<time>2007/03/19 17:09</time>
<caption>DIGITAL SINGLE-LENS REFLEX CAMERA
</caption>
```
~ 3803

FIG.38

```
<id>1</id>
<attribute>PHOTOGRAPH</attribute>
<width>W1</width>
<height>H1</height>
<job>PDL</job>
<user>USER1</user>
<place>F CORP. GTH FLOOR</place>
<time>2007/03/19 17:09</time>
<caption>SINGLE-LENS REFLEX CAMERA</caption>
<caption>DIGITAL SINGLE-LENS REFLEX CAMERA
</caption>
```
— 4001

FIG.40

DEVICE FOR EDITING METADATA OF DIVIDED OBJECT

BACKGROUND OF THE INVENTION

1. Field of the Invention

The present invention relates to an image processing device, such as a multifunction copying machine, which divides image data into objects and edits metadata of the divided objects, and to an image processing method, program and storage medium.

2. Description of Related Art

Recently, offices have rapidly become paperless in the midst of environment problems. A conventional technique for realizing a paperless office management system or image communication system is disclosed in Japanese Patent Laid-Open No. 2001-358857. The management system reads paper documents accumulated in binders and the like with a scanner. Then the document management system converts the images read into Portable Document Format (hereinafter referred to as "PDF"), for example, and manages the documents by storing them in an image storage device. The image communication system transmits the data passing through the PDF conversion or the like to a remote location.

To make effective use of the documents stored as computerized information, a technique for retrieving required information from a large amount of stored information is important. For example, Japanese Patent Laid-Open No. H11-025113 (1999) proposes a method of retrieving an image from documents in which character strings and images such as figures, tables and photographs are mixed. The technique disclosed in Japanese Patent Laid-Open No. H11-025113 (1999) extracts the images and character strings describing the images from the documents, associates the extracted images with the extracted character strings and stores them. Then, at retrieval, it can search character strings having been stored according to any given search word designated by the user, and output images associated with the corresponding character string.

In addition, Japanese Patent Laid-Open No. 2002-055748 proposes a method of facilitating the process of providing comment information to an image. The method displays an image (such as a portrait) and a plurality of icons each of which is associated with metadata (metadata of a person's name, for example), drags and drops the icon on the image, and adds the metadata associated with the icon to the image as a comment.

However, as shown in Japanese Patent Laid-Open No. H11-025113 (1999), there are some cases where no appropriate metadata is added in the method of adding the character string in the document to the image as metadata for retrieval. In addition, even if the appropriate metadata is added, there are some cases where editing of the metadata, such as addition and elimination, is required.

In such a case, by viewing a metadata editing screen on which the image and metadata are displayed, a user usually edits them into any desired metadata by keyboard input. However, if the metadata to be edited is large, there is a problem of increasing the workload of the user.

In addition, a method of dragging and dropping an icon onto an image to add the metadata associated with the icon to the image as a comment, as disclosed in Japanese Patent Laid-Open No. 2002-055748, has a problem of restricting the operation of the user because the manner of adding the comment is always one way and fixed.

More specifically, since the method has only a method of dragging and dropping the icon onto the image, it cannot drag and drop the image onto the icon to add a comment.

As another problem, it is also impossible to add a comment by dragging and dropping a text image onto a photographic image, a photographic image onto a text image or a text image onto a text image. Furthermore, the method cannot change the manner of adding the comment when dragging and dropping a photographic image onto a photographic image, a text image onto a photographic image, a photographic image onto a text image or a text image onto a text image. As a result, there is a problem in which it is difficult for the user to intuitively understand the manner in which the comment is added.

SUMMARY OF THE INVENTION

The present invention provides an image processing device capable of facilitating editing metadata and adding metadata which enables a user to understand intuitively and facilitates its later reuse and search.

The image processing device in accordance with the present invention comprises an input component configured to input image data; an object dividing component configured to divide the image data into a plurality of objects; a metadata adding component configured to add metadata to each object obtained by the object dividing component; a selecting component configured to select a first object and a second object in accordance with a selecting instruction of a user; a metadata analysis component configured to conduct analysis of the individual metadata of the first object and second object selected by the selecting component; a deciding component configured to decide an update procedure of the metadata of the first object and the metadata of the second object in accordance with an analysis result of the metadata analysis component; and an update component configured to update at least one of the metadata of the first object and the metadata of the second object in the update procedure decided by the deciding component.

According to the present invention, metadata addition is made possible to facilitate metadata editing, intuitive understanding of a user, and reuse and search at a later time.

For example, the present invention can not only add metadata of a photographic image to a photographic image, but also add metadata of a text image to a photographic image, metadata of a photographic image to a text image, and metadata of a text image to a text image.

In addition, the present invention can alter the manner of affixing the metadata when associating a photographic image to a photographic image, a text image to a photographic image, a photographic image to a text image, and a text image to a text image. Thus, when associating a second photographic image to a first photographic image, the link destination of the second photographic image can be added to the first photographic image as the metadata so that the second photographic image can be traced easily when the first photographic image is searched for.

Furthermore, in the case of associating a text image with another text image, adding the metadata of the text image with a greater number of caption characters to the text image with a smaller number of caption characters can facilitate intuitive use by the user.

Moreover, in the case of associating a photographic image with another photographic image, the processing can be switched in accordance with the user in such a manner as to add, if the user is the same, the link destination of the second photographic image to the first photographic image, and to add, if the users differ, the second photographic image to the first photographic image. This offers an advantage of being able to prevent the ability to search for the first photographic image from being impaired even if another user rewrites the metadata of the second photographic image to unexpected contents at a later time.

Further features of the present invention will become apparent from the following description of exemplary embodiments (with reference to the attached drawings).

BRIEF DESCRIPTION OF THE DRAWINGS

FIG. 8A and FIG. 8B are diagrams showing block information and input file information on individual attributes in case of object division;

FIG. 19 is a diagram showing an example of SVG (Scalable Vector Graphics) format used in the embodiment 1;

FIG. 27 is a diagram showing data formats of the metadata which will be described in the embodiment 1;

FIG. 30 is a diagram showing an example of the data format of the metadata after editing which will be described in the embodiment 1;

FIG. 31 is a diagram showing an example of the data format of the metadata after editing which will be described in the embodiment 1;

FIG. 33 is a diagram showing an example of the data format of the metadata after editing which will be described in the embodiment 1;

FIG. 34 is a diagram showing an example of the data format of the metadata after editing which will be described in the embodiment 1;

FIG. 38 is a diagram showing data formats of the metadata which will be described in the embodiment 2;

FIG. 40 is a diagram showing an example of the data format of the metadata after editing which will be described in the embodiment 2.

DESCRIPTION OF THE EMBODIMENTS

Embodiment 1

A first embodiment of an image processing method in accordance with the present invention will now be described with reference to the accompanying drawings.

In the present embodiment 1, a method of switching a merging method of metadata in accordance with the attributes of associated first and second objects will be described.

The present embodiment refers to the following drawings.

Figure 1:
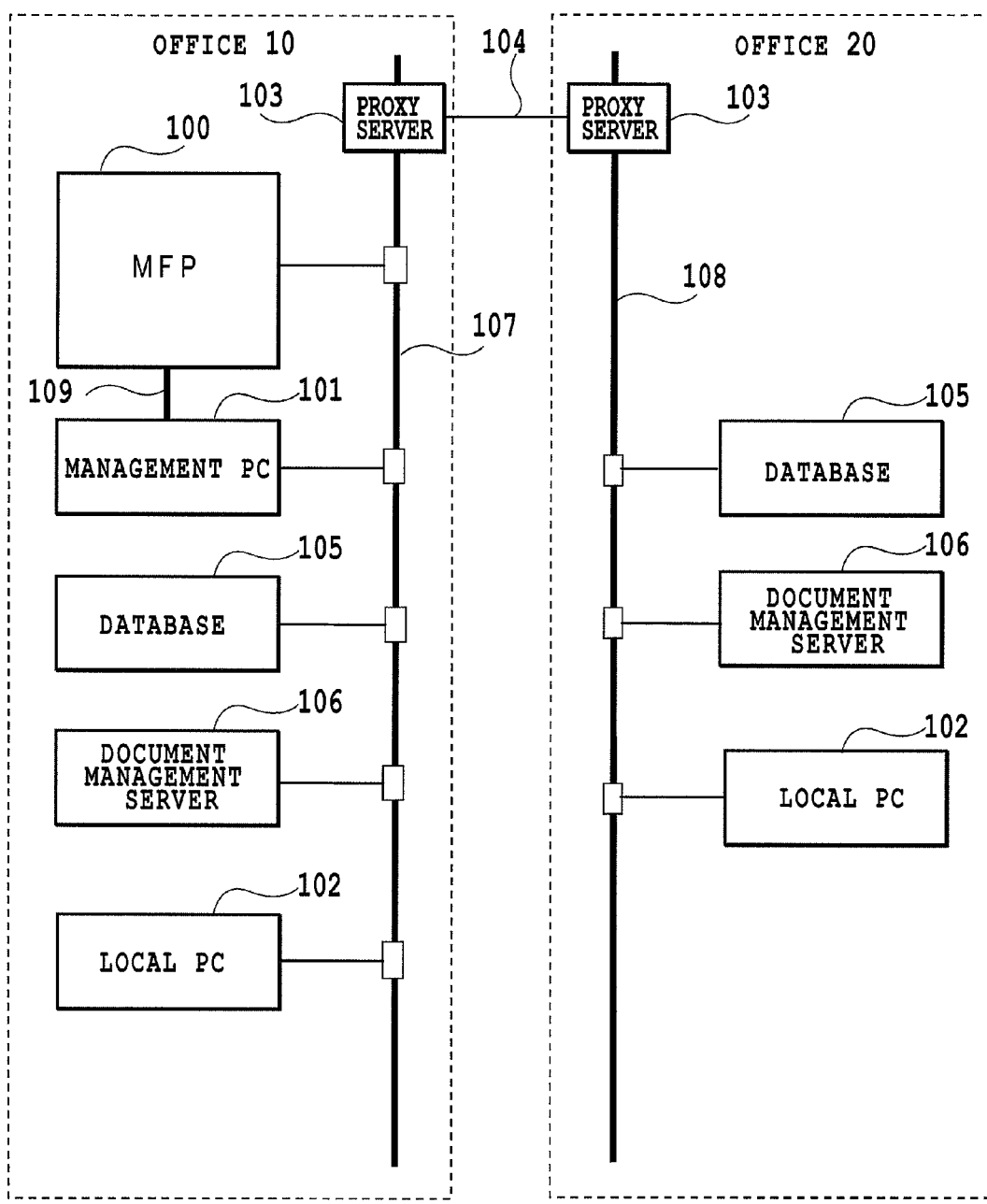
FIG. 1 is a block diagram showing an image processing system to which the present invention is applicable.
Figure 2:
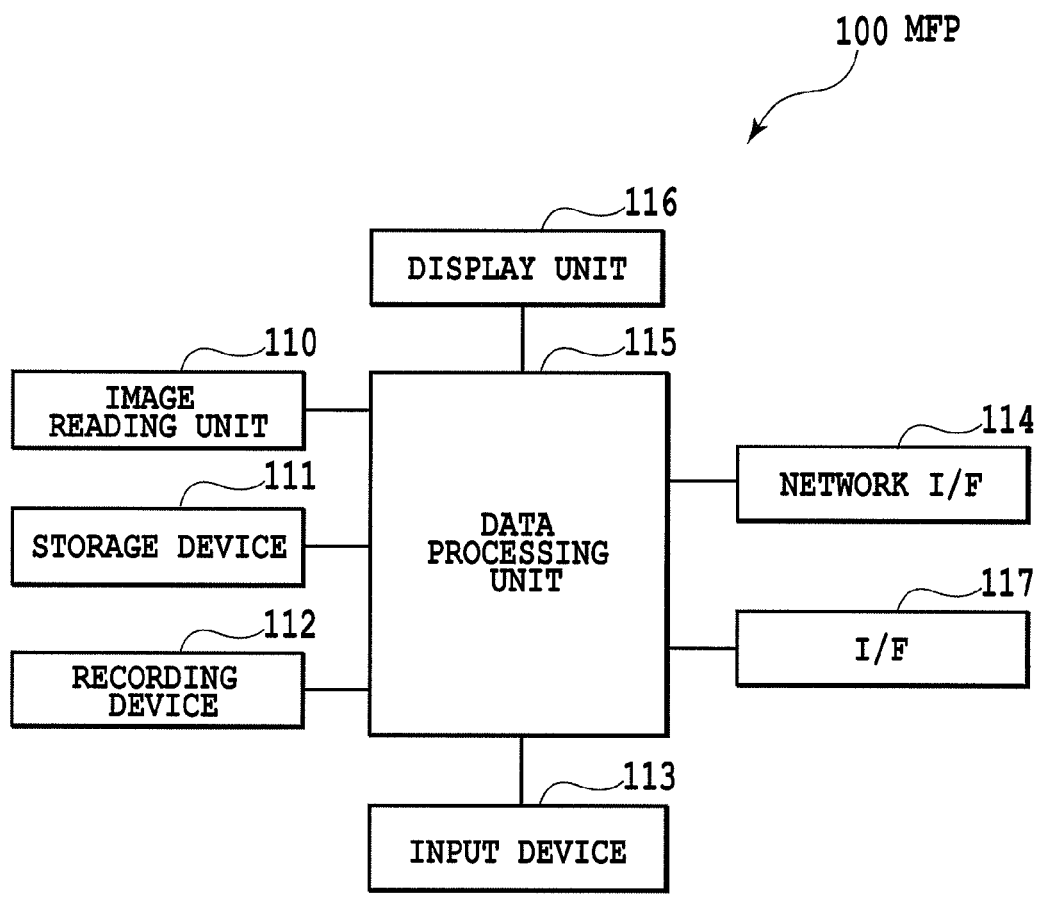
FIG. 2 is a block diagram showing the MFP in FIG. 1.
Figure 3:
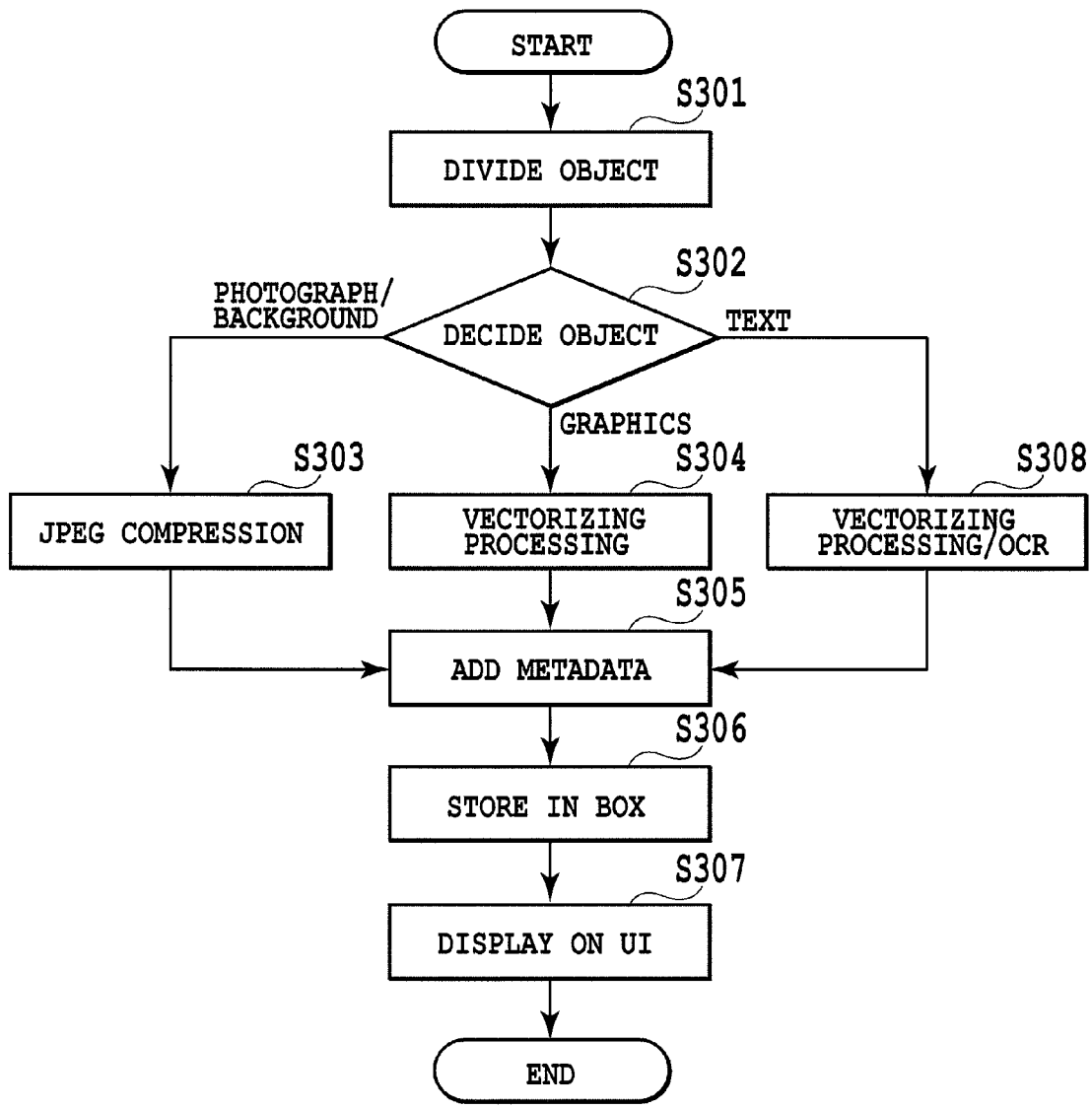
FIG. 3 is a first data processing flow, which will be described in an embodiment 1.
Figure 7:
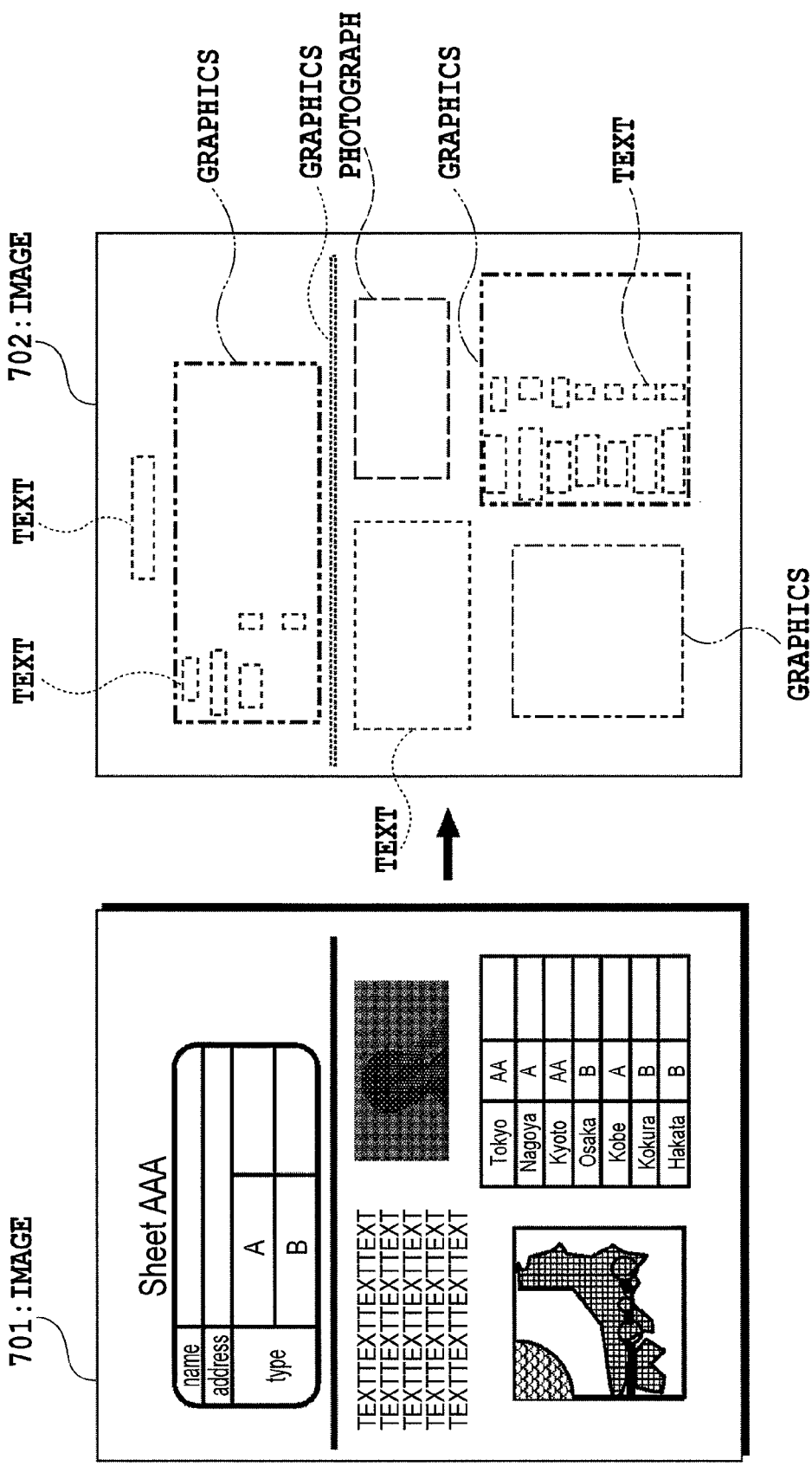
FIG. 7 is a diagram showing an example of the result of dividing an object.
Figure 9:
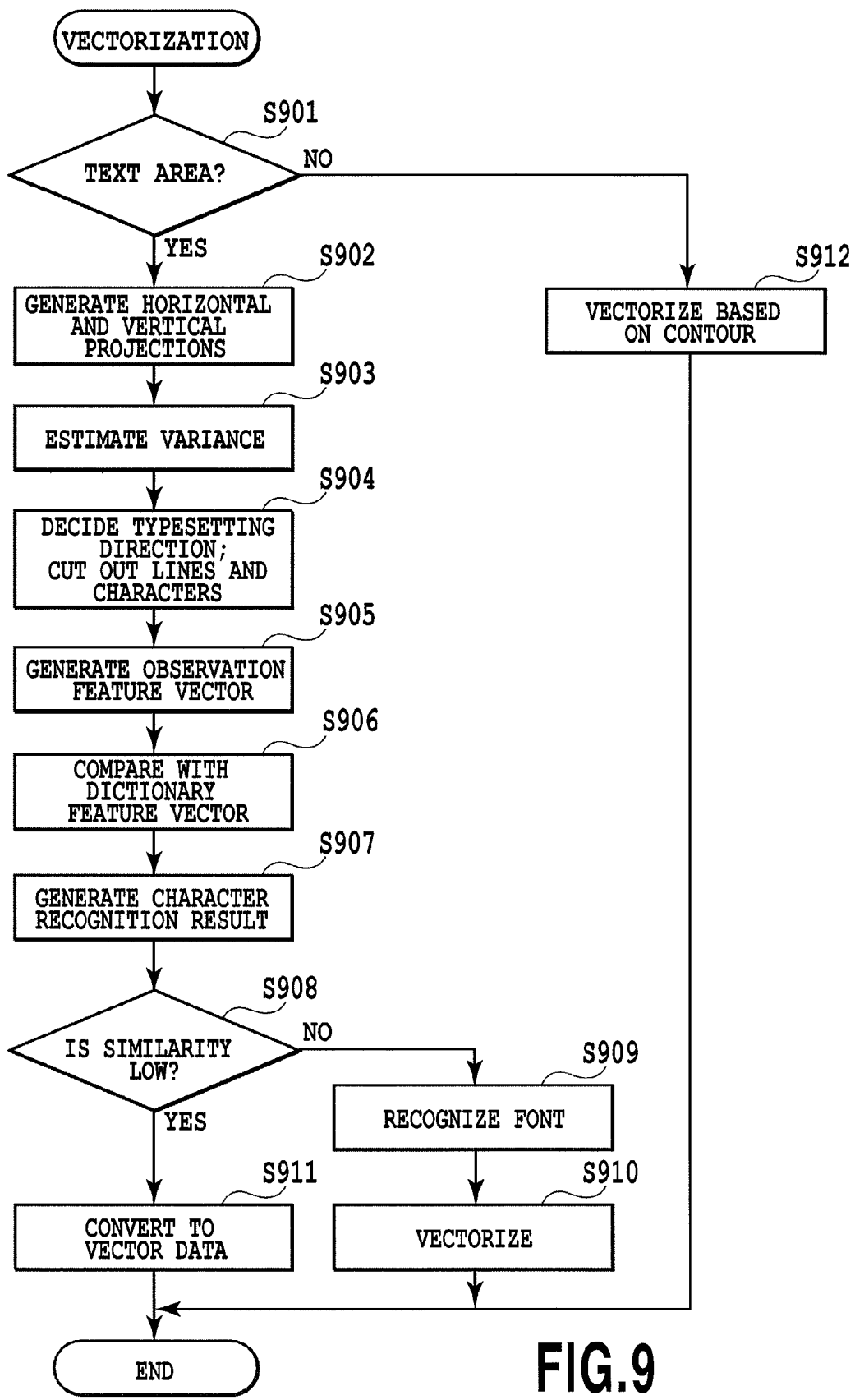
FIG. 9 is a flowchart of vectorizing processing which will be described in the embodiment 1.
Figure 10:
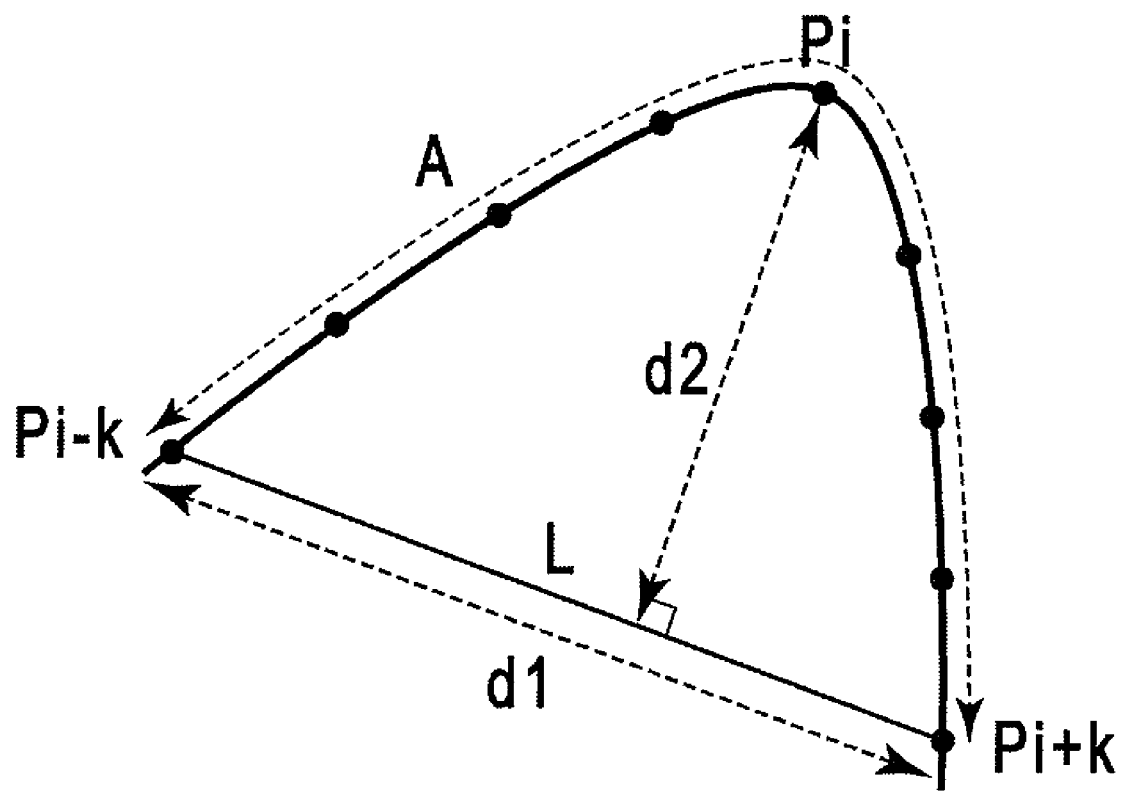
FIG. 10 is a diagram showing angle extracting processing in the vectorizing processing.
Figure 11:
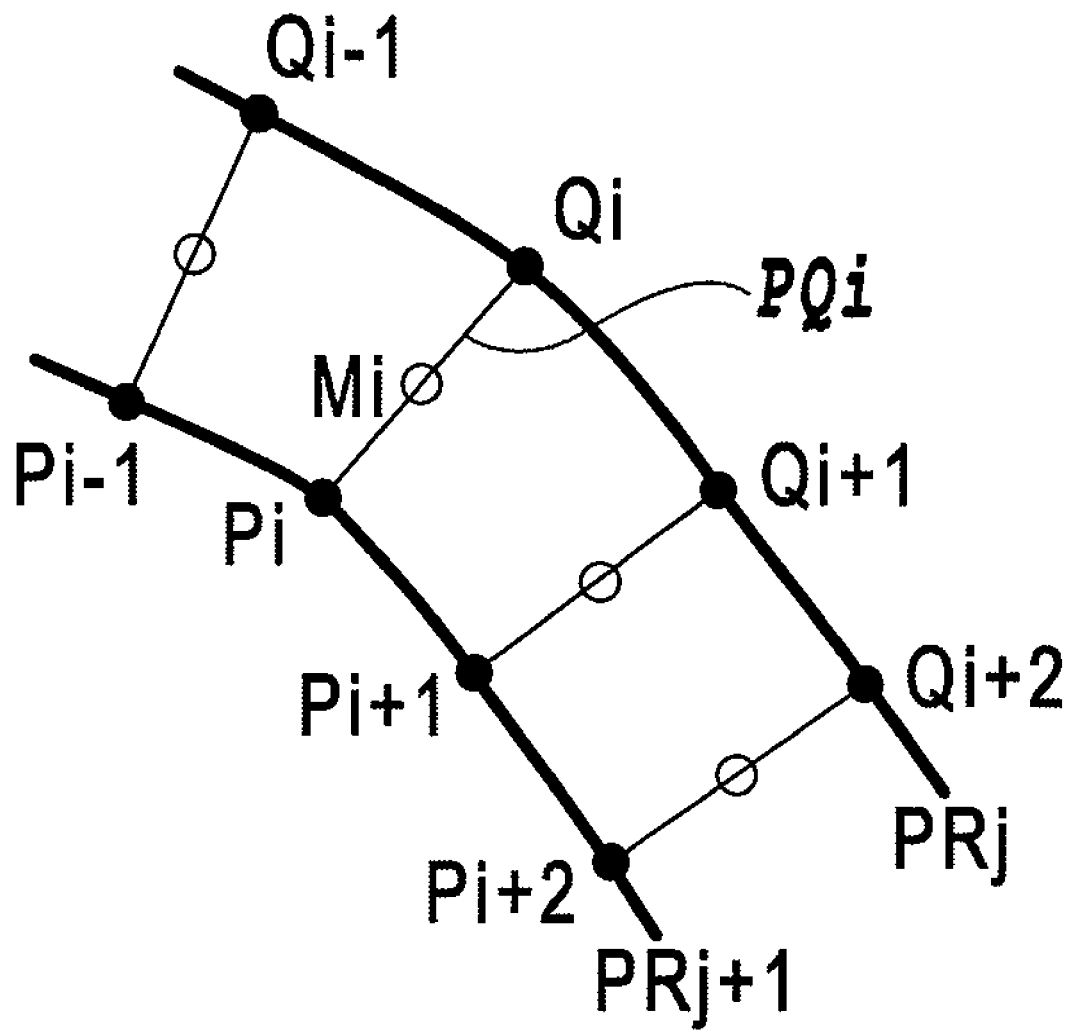
FIG. 11 is a diagram showing outline grouping processing in the vectorizing processing.
Figure 12:
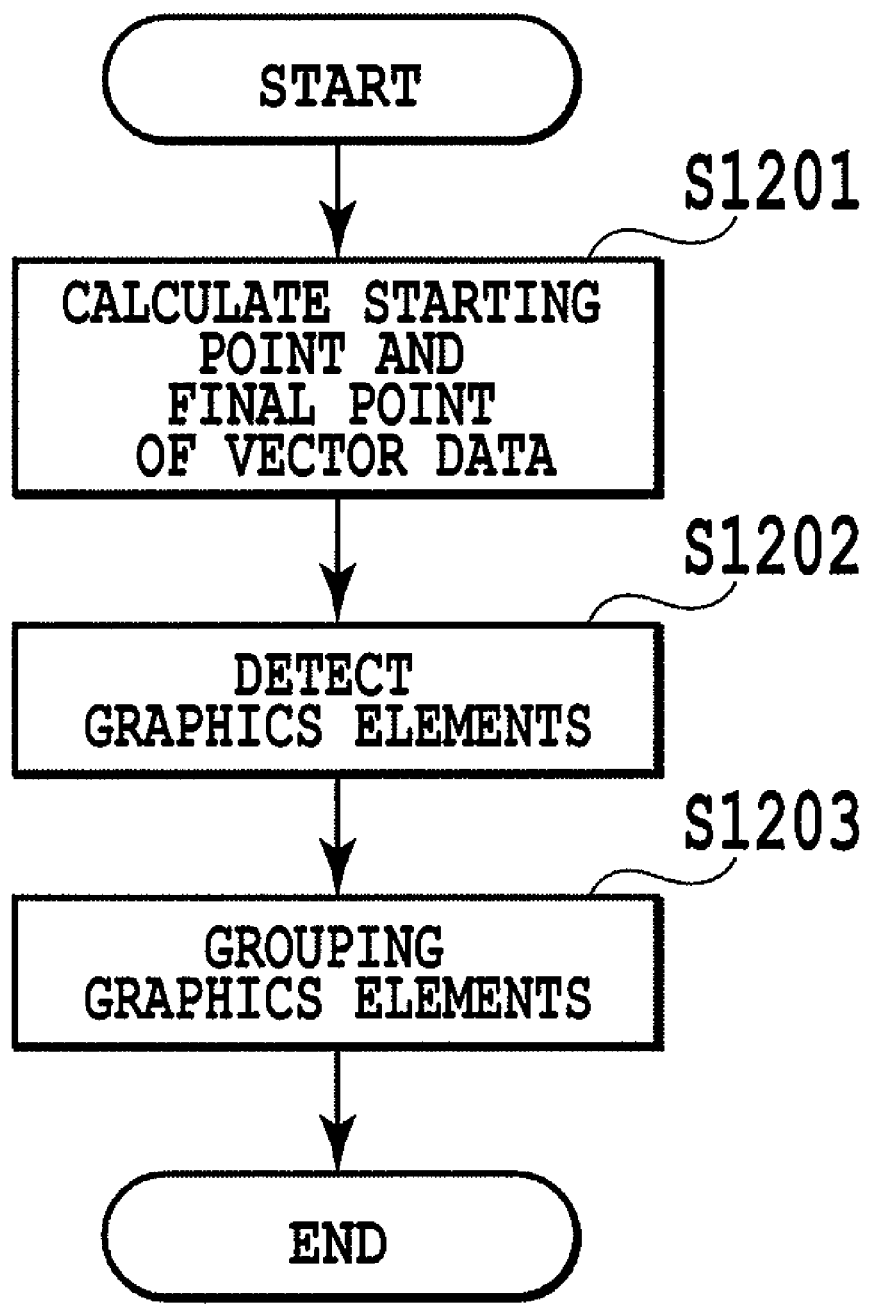
FIG. 12 is a flowchart showing grouping processing of the vector data generated in FIG. 9.
Figure 13:
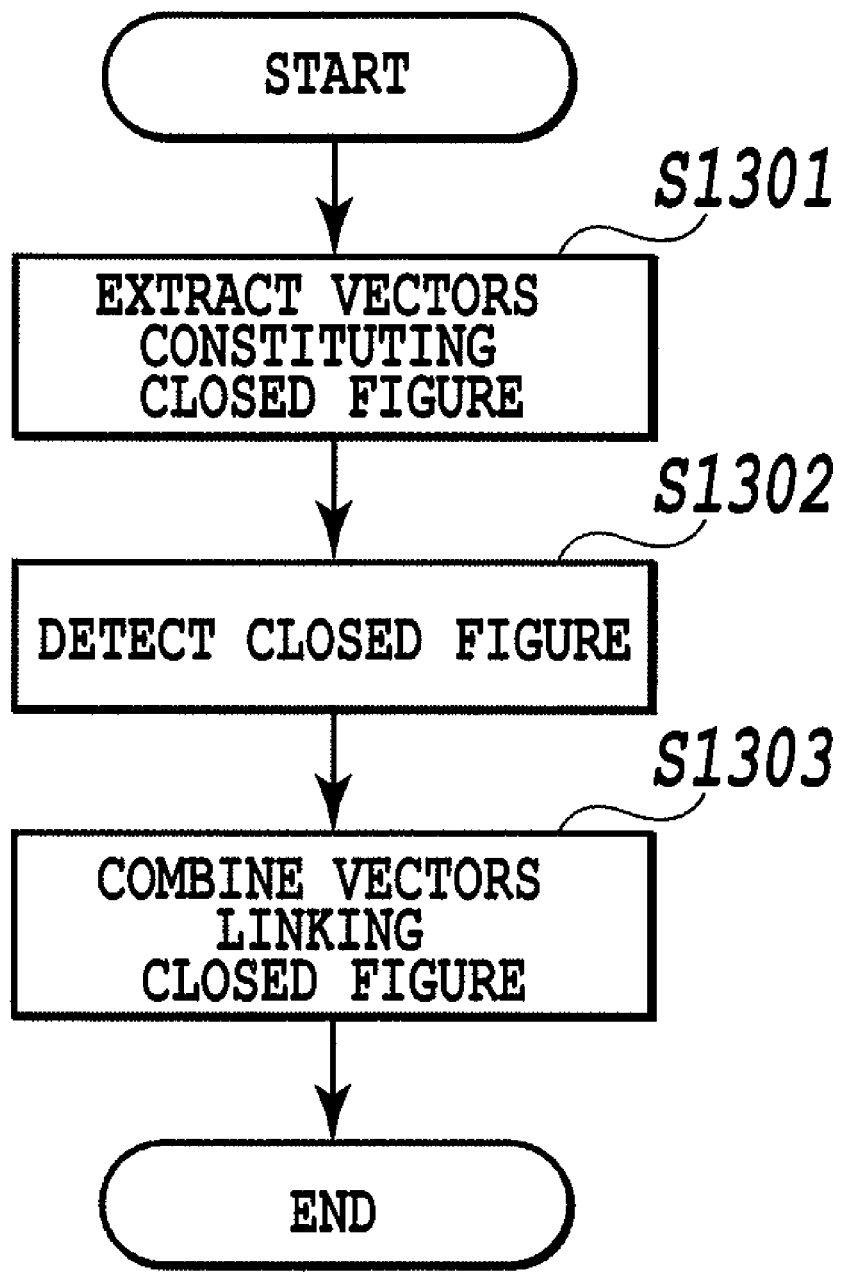
FIG. 13 is a flowchart showing graphics element detecting processing of the vector data grouped in the processing of FIG. 12.
Figure 14:
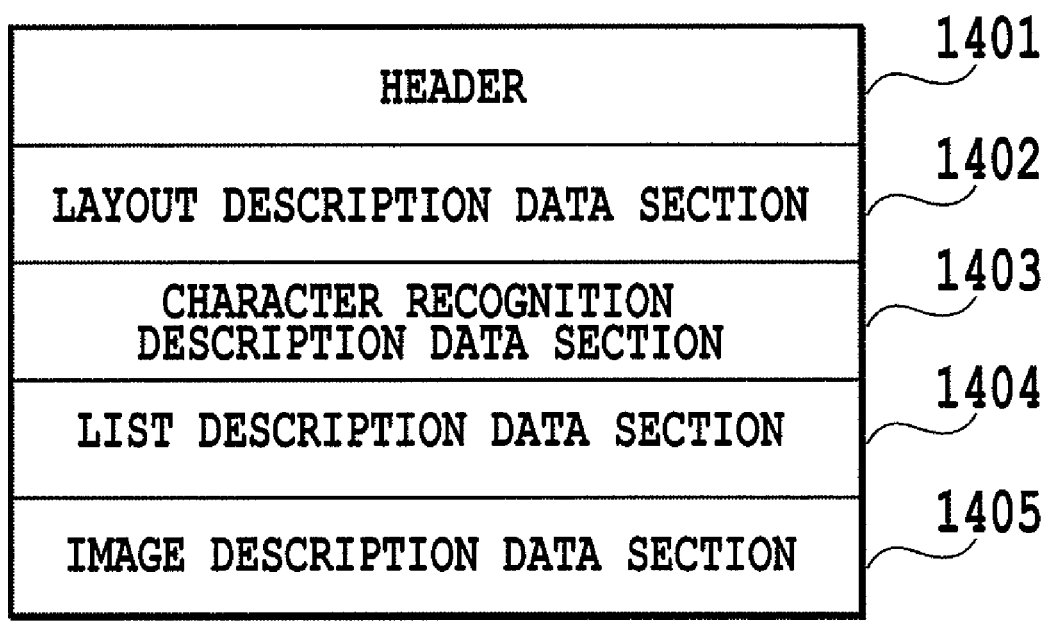
FIG. 14 is a map showing the data obtained as a result of the vectorizing processing in the embodiment 1.
Figure 15:
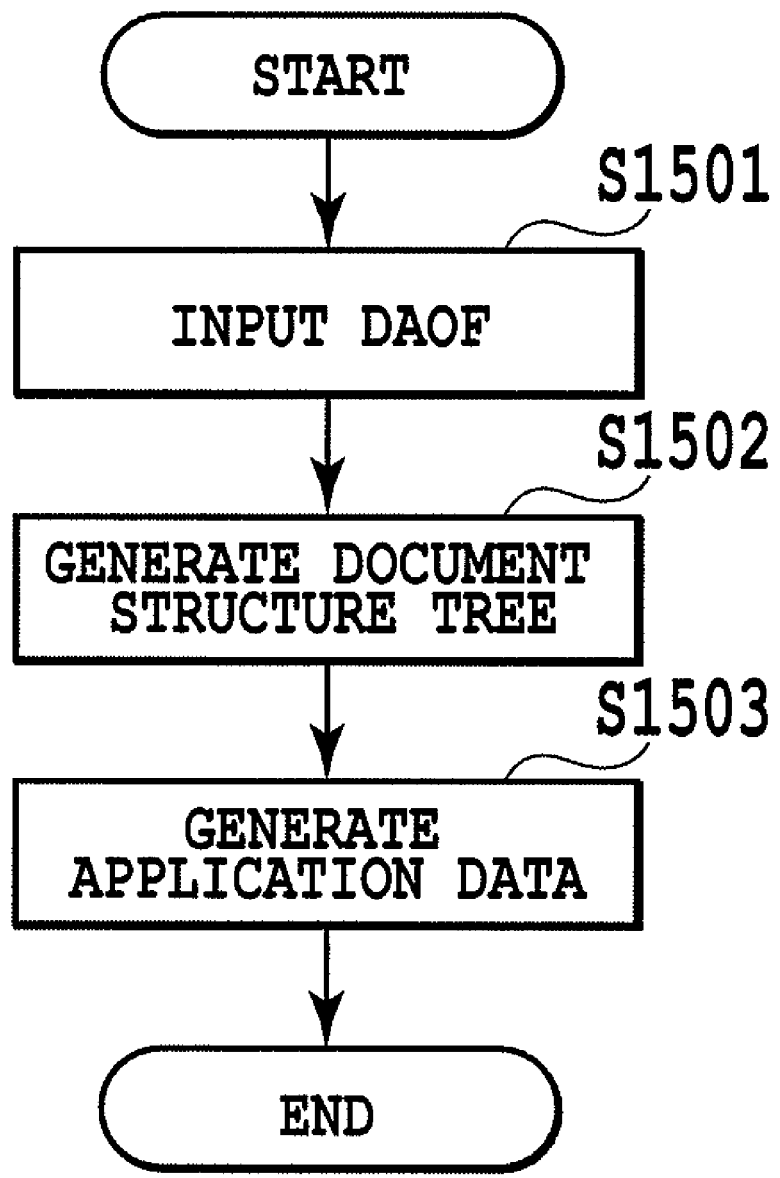
FIG. 15 is a flowchart showing application data converting processing.
Figure 16:
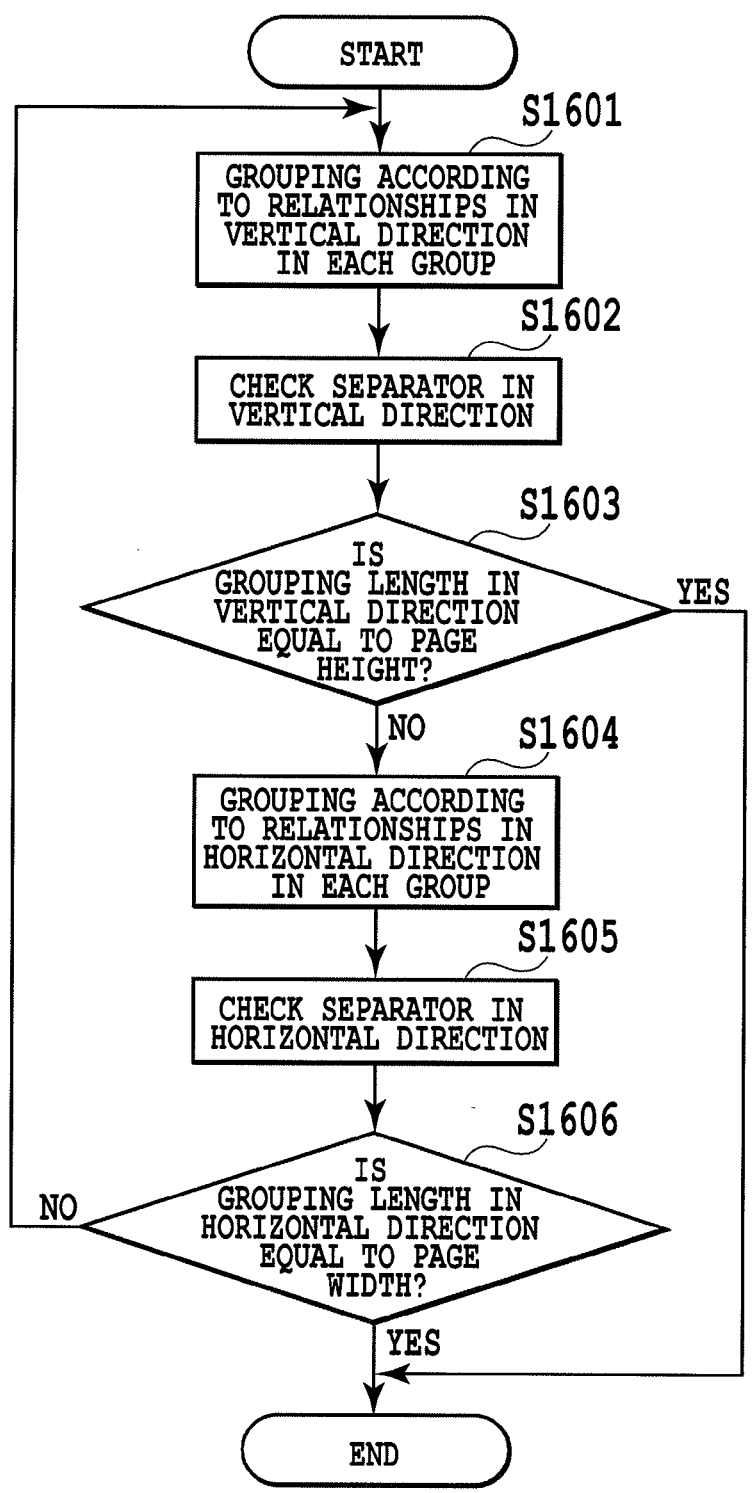
FIG. 16 is a flowchart showing the document structure tree generating processing of FIG. 15.
Figure 17:
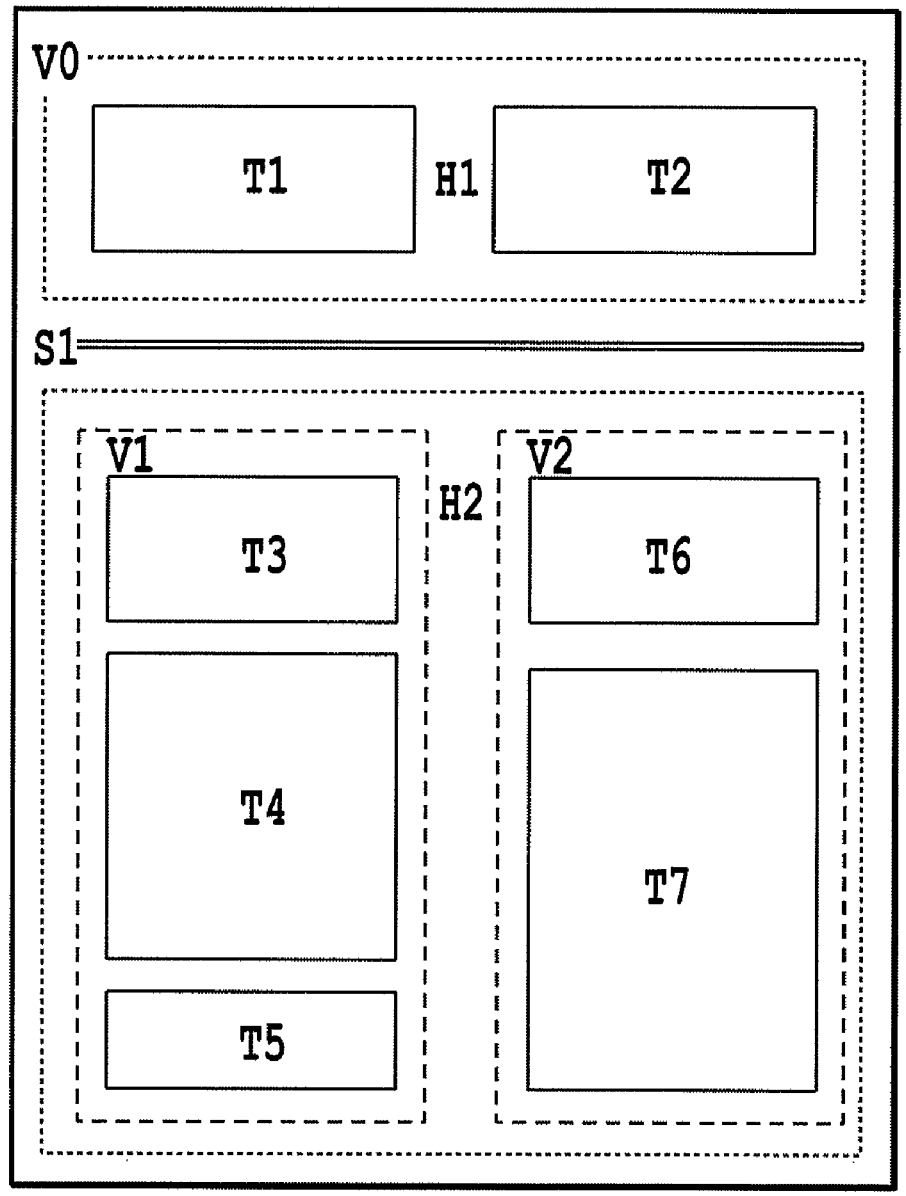
FIG. 17 is a diagram showing a document which will become a target of the document structure tree generating processing.
Figure 18:
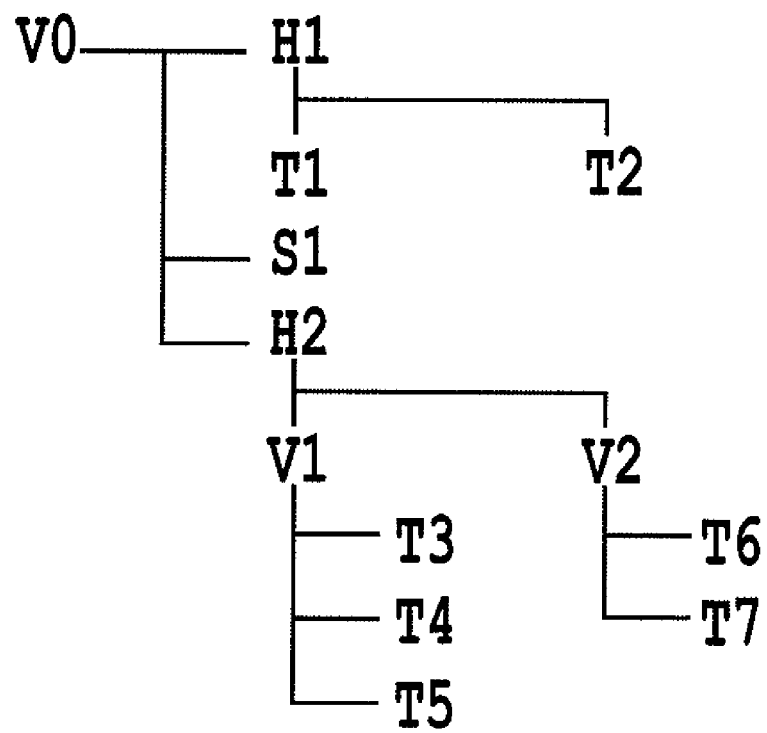
FIG. 18 is a diagram showing a document structure tree generated by the processing of FIG. 16.

FIG. 1 is a block diagram showing an image processing system to which the present invention is applicable; FIG. 2 is a block diagram showing the MFP (abbreviated to "MFP" from now on) in FIG. 1; and FIG. 3 is a first data processing flow which will be described in the present embodiment 1. FIG. 7 shows an example of the result of area division performed by object dividing processing executed in vectorizing processing; and FIG. 8A and FIG. 8B show block information and input file information on individual attributes at a time of object division. FIG. 9 is a flowchart of vectorizing processing that is important in the conversion to reusable data. FIG. 10 is a diagram showing angle extracting processing in the vectorizing processing; and FIG. 11 is a diagram showing outline grouping processing in the vectorizing processing. FIG. 12 is a flowchart showing grouping processing of the vector data generated in FIG. 9; and FIG. 13 is a flowchart showing graphics element detecting processing for the vector data grouped in the processing of FIG. 12. FIG. 14 is a map showing the data obtained as a result of the vectorizing processing in the present embodiment 1; and FIG. 15 is a flowchart showing application data converting processing. FIG. 16 is a flowchart showing the document structure tree generating processing of FIG. 15; and FIG. 17 is a diagram showing a document which will become a target of the document structure tree generating processing. FIG. 18 is a diagram showing a document structure tree generated by the processing of FIG. 16; and FIG. 19 is a diagram showing an example of Scalable Vector Graphics (abbreviated to "SVG" from now on) format which will be described in the present embodiment 1. [Image Processing System].

An image processing system usable by the present embodiment will be described with reference to FIG. 1.

In FIG. 1, the image processing system in the present embodiment is used in an environment in which an office 10 and an office 20 are connected via the Internet 104.

A multifunction peripheral 100 as a recording device is connected to a LAN 107 constructed in the office 10. In addition, a management PC 101 for controlling the MFP 100, a local PC 102, a document management server 106, and a database 105 for the document management server 106 is connected in the system.

A LAN 108 is constructed in the office 20. A document management server 106, and a database 105 for the document management server 106 are connected to the LAN 108.

A proxy server 103 is connected to each of the LANs 107 and 108 so as to connect the LANs 107 and 108 to the Internet.

The MFP 100 takes charge of part of the image processing of an input image read from a manuscript, and supplies the image data obtained as the processing result to the management PC 101 via a LAN 109. In addition, the MFP 100 serves as a printer which interprets a Page Description Language (abbreviated to "PDL" hereinafter) sent from the local PC 102 or a general-purpose PC (not shown). Furthermore, MFP 100 includes a function of transferring the image read from the manuscript to the local PC 102 or to the general-purpose PC (not shown). The management PC 101 is an ordinary computer including an image storage component, image processing component, display component, and input component, and part of these components is integrated into the MFP 100 functionally to form a component of the image processing system. Although it is assumed in the present embodiment that the registering processing and the like which will be described below is executed in the database 105 via the management PC, it is also possible for the MFP to execute the processing carried out by the management PC.

In addition, the MFP 100 is directly connected to the management PC 101 via the LAN 109.
[MFP]

In FIG. 2, the MFP 100 has an image reading unit 110 including an Auto Document Feeder (abbreviated as "ADF" hereinafter) (not shown). The image reading unit 110 illuminates an image of a sheaf or sheet of manuscript with a light source, and forms a reflected image on a solid-state image sensing device via a lens. The solid-state image sensing device generates an image readout signal with a predetermined resolution (600 dpi, for example) and a predetermined luminance level (8 bits, for example) so that the image readout signal constitutes the image data consisting of raster data.

The MFP 100 has a storage device (referred to as "BOX" hereinafter) 111 and a recording device 112, and when executing an ordinary copying function, the MFP 100 converts the image data to a recording signal through the image processing for copying by a data processing unit 115. In the case of multiple copying, it temporarily retains a page of the recording signal in the BOX 111, and outputs it to the recording device 112 successively to form the recording image on recording papers.

The MFP 100 includes a network I/F 114 for connecting it to the LAN 107, and can record with the recording device 112 the PDL data based on the PDL language output from the local PC 102 or other general-purpose PC (not shown) via a driver. The PDL data output from the local PC 102 via the driver is supplied to the data processing unit 115 via the LAN 107 and network I/F 114. After that, the PDL data is converted to a recordable recording signal through interpretation and processing of the PDL language, and is recorded on the recording paper as the recording image by the MFP 100.

The BOX 111 is capable of storing the data from the image reading unit 110 and data obtained by rendering the PDL data supplied from the local PC 102 via the driver.

The MFP 100 is controlled by a key operation unit (input device 113) installed in the MFP 100 or by an input device (keyboard, pointing device and the like) of the management PC 101. The data processing unit 115 carries out predetermined control with an internal control unit (not shown).

The MFP 100 has a display unit 116 capable of displaying an operation input state and the image data to be processed.

The BOX 111 can be controlled directly from the management PC 101 via an I/F 117. The LAN 109 is used for exchanging data and control signals between the MFP 100 and management PC 101.
[Details of Data Processing Device 115]

Next, details of the data processing unit 115 of FIG. 2 will be described with reference to FIG. 41.

Figure 41:
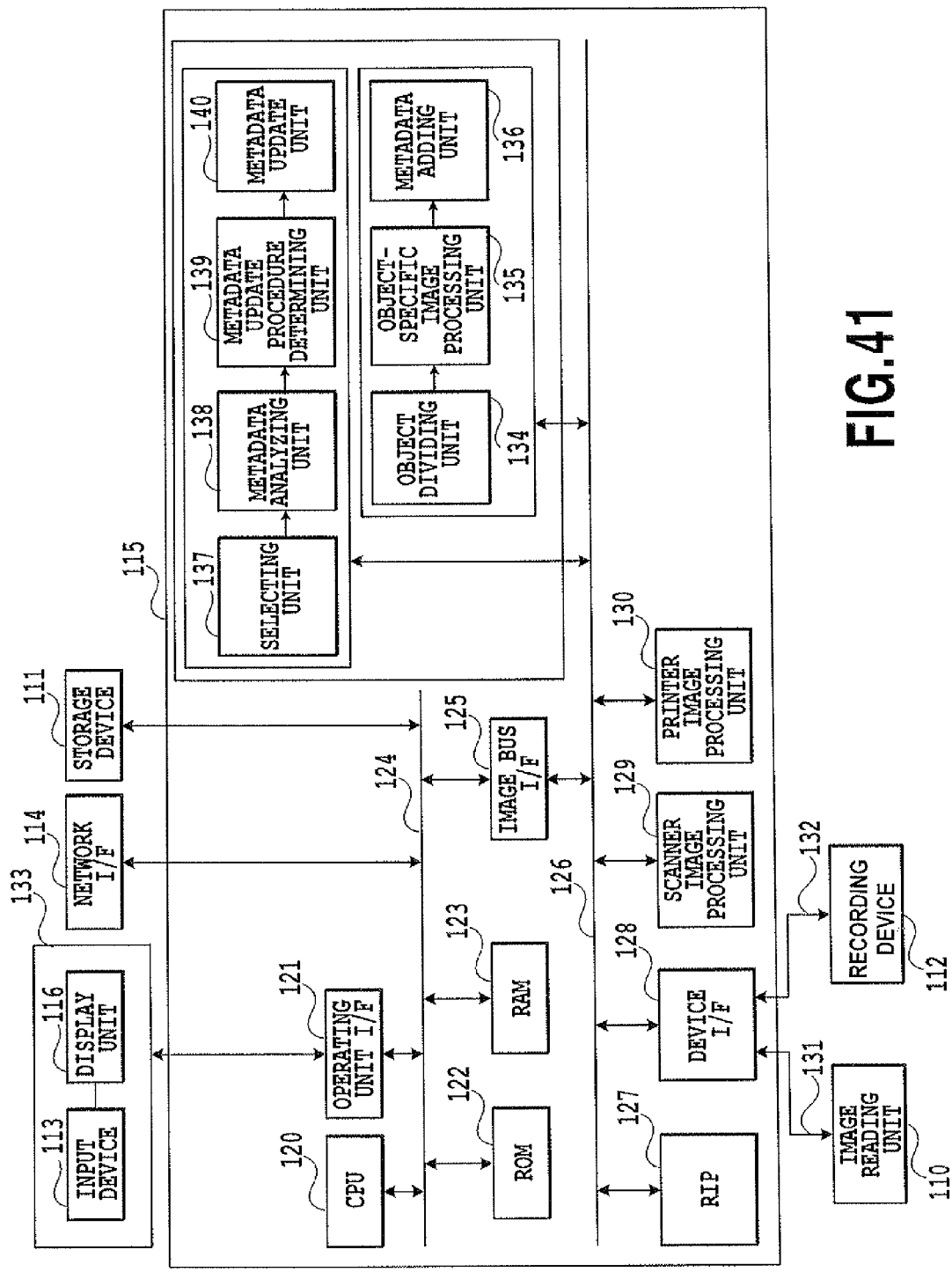
FIG. 41 is a block diagram showing details of a data processing unit 115 which will be described in the embodiment 1.

As for the components 110-116 of FIG. 41, part of their description will be omitted because they are described in the description of FIG. 2.

The data processing unit 115 is a control unit comprising a CPU, a memory and other elements, and carries out input/output of the image information and device information. Here, a CPU 120 controls the whole system. A RAM 123 is a system working memory for operation of the CPU 120, and is also an image memory for temporarily storing the image data. A ROM 122 is a boot ROM that stores a boot program of the system.

An operating unit I/F 121 is an interface with an operating unit 133, and outputs the image data to the operating unit 133 to be displayed thereon. In addition, the operating unit I/F 121 transfers the information a user of the image processing device inputs from the operating unit 133 to the CPU 120. The foregoing devices are on a system bus 124. An image bus interface (Image Bus I/F) 125, which connects the system bus 124 to an image bus 126 for transferring the image data at a high speed, is a bus bridge for converting a data structure.

The image bus 126 consists of a PCI bus or IEEE 1394, for example. The following devices are provided on the image bus 126. A raster image processor (RIP) 127 analyzes PDL codes to develop into a bitmap image. A device I/F 128 connects the image reading unit 110, which serves as an image input/output device, to the control unit 115 via a signal line 131, and the recording device 112 to the control unit 115 via a signal line 132, and carries out synchronous/asynchronous conversion of the image data.

A scanner image processing unit 129 performs correction, processing and editing of the input image data. A printer image processing unit 130 performs correction, resolution conversion and the like of the printout image data to be output to the recording device 112 in accordance with the recording device 112.

An object dividing unit 134 performs object division, which will be described later, when storing each object as described later. An object-specific image processing unit 135 executes image processing by adaptively switching in accordance with the attributes of the objects divided by the object dividing unit 134. Details of the processing will be described later. A metadata adding unit 136 adds the metadata, which will be described later, to the object passing through the image processing of the object-specific image processing unit 135.

A selecting unit 137 selects, in the editing processing of the metadata, described later, a transmitted object and a receiving object, which will become editing targets selected and instructed by the user through the operating unit 133 and which will be described later. As for the objects selected by the selecting unit 137, a metadata analyzing unit 138 conducts metadata analysis, a metadata update procedure determining unit 139 decides the update procedure of the metadata, and a metadata update unit 140 carries out editing of the metadata.

[Saving of Each Object]

Referring to FIG. 3, saving of each object, which is carried out by the object dividing unit 134, object-specific image processing unit 135, and metadata adding unit 136 shown in FIG. 41, will be described in detail.

FIG. 3 is a flowchart for saving the bitmap image data of the MFP 100 on an object by object basis.

In the MFP 100, the bitmap image data is acquired by the image reading unit 110. Alternatively, the bitmap image data is generated by rendering within the MFP 100 a document created by application software on the local PC 102.

First, at step S301, the object division is made. Here, the types of objects after the object division are assumed to be text, photograph, graphics (drawings, line drawings and tables) and background. As for each divided object, a decision as to the type (text, photograph, graphics or background) of the object is made at step S302 without changing the condition of the bitmap data. In the case of a photograph, the object undergoes JPEG compression in the bitmap state at step S303. In addition, in the case of the background, the object also undergoes JPEG compression in the bitmap state at step S303.

Next, when the object decision result is graphics, the object undergoes vectorizing processing at step S304. Finally, when the object decision result is text, the object undergoes vectorizing processing in the same manner as the graphics at step S304.

Furthermore, in the case of text, the object undergoes the vectorizing processing or OCR processing at step S308. The vectorizing processing is the same as that used at step S304. As for the data passing through the OCR processing, it is converted to character encoding data. All the object data and the character encoding data are combined into a single file.

Next, at step S305, optimum metadata is added to each object. The individual objects added to the metadata are stored in the BOX included in the MFP 100 at step S306. The stored data are displayed on the UI screen at step S307.

[Creation of Bitmap Image Data]

Here, the input method of the image data subjected to the object division at 5301 of FIG. 3 will be described.

The bitmap image data creation, in the following two cases, will be described with reference to FIGS. 5 and 6.

(a) When Inputting from the Image Reading Unit of the MFP 100.

Figure 5:
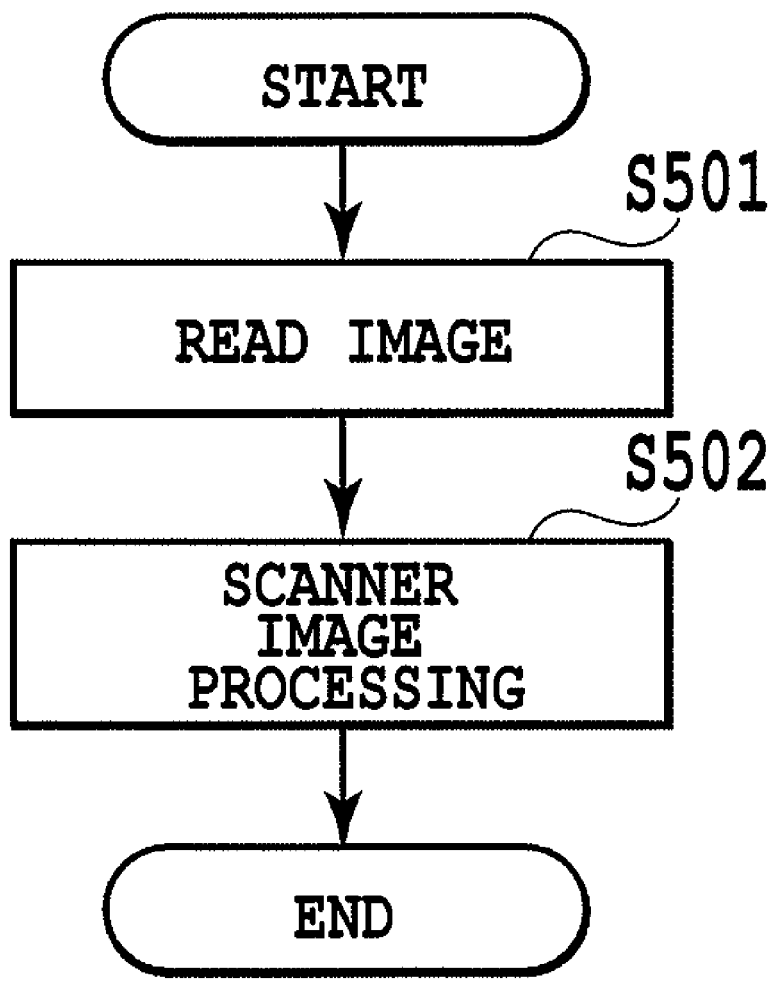
FIG. 5 is a flow showing reading from a scanner, which will be described in the embodiment 1.

When the image reading unit of the MFP 100 is used, it reads the image at step S501 of FIG. 5. The read image is already bitmap image data. The bitmap image data is subjected to the scanner image processing at step S502. The scanner image processing refers to processing such as color processing and filter processing.

(b) When Using Application Software on the PC 102.

Figure 6:
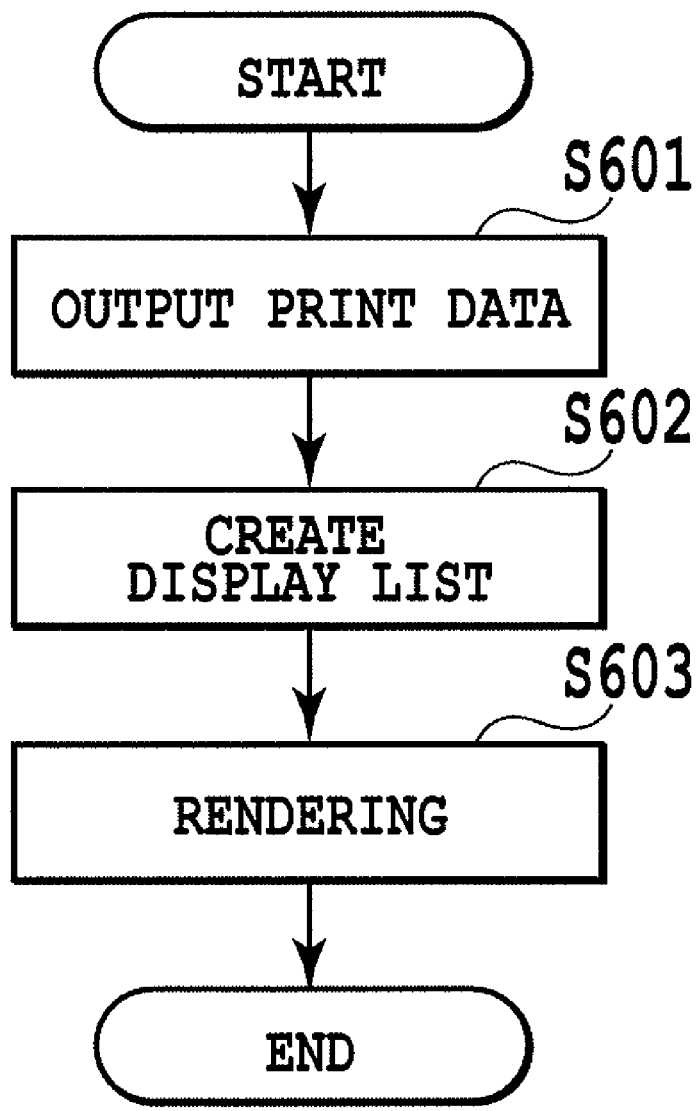
FIG. 6 is a flow for converting data from a PC to a bitmap, which will be described in the embodiment 1.

The application data created by using application software on the PC 102 is converted to print data via a print driver on the PC 102 at step S601 of FIG. 6, and is transmitted to the MFP 100. The term "print data" here refers to the PDL data based on LIPS (LBP Image Processing System), Postscript and the like, for example.

Next, at step S602, a display list is generated via the interpreter included in the MFP 100. The display list is subjected to rendering at step 603 to generate the bitmap image data.

The bitmap image data generated by the foregoing two examples undergoes the object division at step 301 described above.

[Metadata Addition (Step S305)]

Here, details of the metadata addition at the foregoing step S305 will be described with reference to FIG. 4.

Figure 4:
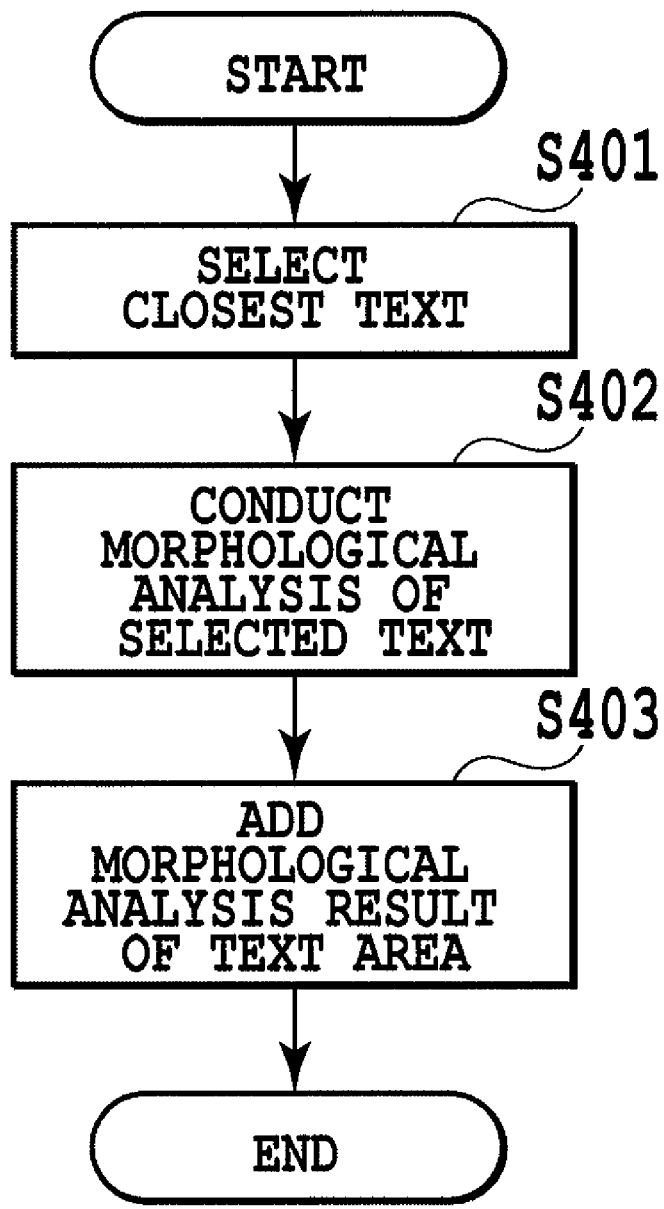
FIG. 4 is a processing flow for adding meta-information, which will be described in the embodiment 1.

FIG. 4 is a flowchart concerning the metadata addition at step S305.

First, at step S401, a text object closest to the object of interest in its neighborhood is selected.

Next, at step S402, morphological analysis of the selected text object is performed. A word extracted as a result of the morphological analysis is added to each object as metadata at step 403. It goes without saying that the metadata can be created not only by the morphological analysis, but also by an image feature extraction method, syntax analysis and the like.

[Details of Vectorized Data]

As a concrete example of the vectorized data obtained in the vectorizing processing at 5304 of FIG. 3, an example of a format of the vectorized data is shown in FIG. 19. Although the present embodiment expresses the vectorized data in an SVG format, the expression is not limited to it.

In FIG. 19, the expression of the objects is enclosed with frames. A frame 1901 represents an image attribute that shows the area information indicating the area of the image object and the bitmap information on the image object. A frame 1902 represents text object information, and a frame 1903 represents the contents in the frame 1902 in terms of a vector object. The following frame 1904 represents line art such as a list object.

[Object Division Step]

Next, details of the object division at the foregoing step S301 will be described.

At step S301 (object division step), the input image is divided into rectangular blocks in accordance with the attributes as shown in the image 702 in the right half portion of FIG. 7. As described before, as the attributes of the rectangular blocks, there are text, photograph, and graphics (drawing, line drawing, tables and so on).

In the object division step, the image data stored in a RAM (not shown) is binarized into black and white, first, followed by extracting clusters of pixels enclosed by black pixel contours.

Then, the size of each black cluster of pixels extracted in this way is estimated, and the contour tracking of a white cluster of pixels inside the black cluster of pixels with a size not less than a predetermined value is carried out. Processing such as estimation of the size of the white cluster of pixels, followed by tracking of an internal black cluster of pixels, and estimation of an internal cluster of pixels, followed by the contour tracking, is conducted recursively as long as the internal cluster of pixels is not less than the predetermined. The size of the cluster of pixels is estimated according to the area of the cluster of pixels, for example.

A rectangular block circumscribing the cluster of pixels thus obtained is generated, and the attribute is decided in accordance with the size and shape of the rectangular block.

For example, as for a rectangular block having a ratio of width to height that is nearly one and a size within a certain limit, it is made a text equivalent block which is likely to be a text area rectangular block. If neighboring text equivalent blocks are arranged regularly, a new rectangular block is generated by combining such text equivalent blocks, and the new rectangular block is made a text area rectangular block.

In addition, a black cluster of pixels that includes flat clusters of pixels or rectangular white clusters of pixels whose size is not less than a predetermined value and which are arranged in order is made a graphics area rectangular block, and the other indeterminate form clusters of pixels are made photographic area rectangular block.

In the object division step, as for each rectangular block generated in this way, block information such as an attribute and input file information is generated as shown in FIG. 8A and FIG. 8B.

In FIG. 8A and FIG. 8B, the block information includes the attribute, the coordinates X and Y of the position, the width W and height H, and the OCR information of each block. The attribute is given in terms of a numerical value of 1-3: 1 represents a text area rectangular block; 2 represents a photographic area rectangular block; and 3 represents a graphics area rectangular block. The coordinates X and Y are of the starting point (the coordinates at the upper left corner) of each rectangular block in the input image. The width W and height H are the width in the X coordinate direction and the height in the Y coordinate direction of the rectangular block. The OCR information indicates the presence or absence of pointer information in the input image. In addition, the block total N indicating the total number of rectangular blocks is retained as input file information.

The block information on each rectangular block is used for vectorizing in a specified area. In addition, the block information enables determining relative positional relationships between the specified area and the other areas when combining them, thereby making it possible to combine the vectorizing area with the raster data area without impairing the layout of the input image.

[Vectorizing Step]

Next, details of the vectorizing processing at the foregoing step S304 will be described with reference to FIG. 9. To be concrete, the processing at step S304 (vectorizing step) is executed through individual steps of FIG. 9.

Step S901: A decision is made as to whether the specified area is a text area rectangular block or not. If it is a text area rectangular block, the processing proceeds to step S902 and forward to obtain corresponding character codes by recognition using a technique of well-known pattern matching. Unless the specified area is a text area rectangular block, the processing proceeds to step S912.

Step S902: To make a horizontal writing or vertical writing decision (typesetting direction decision) for the specified area, horizontal and vertical projections are taken for the pixel values in the specified area.

Step S903: The variance of the projections obtained at step S902 is estimated. If the variance of the horizontal projection is greater, a decision of the horizontal writing is made, and if the variance of the vertical projection is greater, a decision of the vertical writing is made.

Step S904: According to the estimation result at step S903, the typesetting direction is decided, and cutting out of lines is carried out. After that, a text image is obtained by cutting out characters from the cutout lines.

For the break down into character strings and characters, in the case of the horizontal writing, lines are cut out using the projection in the horizontal direction, followed by cutting out the characters from the projection of the cutout lines in the vertical direction. As for the text area of the vertical writing, the opposite processing is performed with respect to the horizontal and the vertical directions. The character size can be detected at the time of cutting out the lines and characters.

Step S905: As for each character cut out at step S904, an observation feature vector is generated by converting features obtained from the text image to a numerical value sequence with several tens of dimensions. There are various publicly known techniques for extracting the observation feature vectors. For example, there is a method of dividing a character into a mesh, and forming as a feature vector a (mesh count)-dimensional vector by counting character lines within each mesh cell in respective directions as line elements.

Step S906: By comparing the observation feature vector obtained at step S905 with a dictionary feature vector obtained in advance for each font type, the distance between the observation feature vector and the dictionary feature vector is obtained.

Step S907: By estimating the distance between the individual feature vectors calculated at step S906, the font type closest in the distance is made a recognition result.

Step S908: In the distance estimation at step S907, a decision is made as to whether the shortest distance is greater than a predetermined value or not to decide the degree of similarity. If the degree of similarity is not less than the predetermined value, it is very likely that the character is mistaken for another character similar in form in the dictionary feature vector. Thus, if the degree of similarity is not less than the predetermined value, the recognition result at step S907 is not accepted, and the processing proceeds to step S911. If the degree of similarity is less than the predetermined value, the recognition result at step S907 is accepted, and the processing proceeds to step 909.

Step S909 (Font Recognition Step): A plurality of dictionary feature vectors, which are used for character recognition and are equal in number to the font types, have been prepared for each character type, that is, for each font type. Thus, at the pattern matching, the character font can be recognized by outputting the font type of the dictionary feature vectors together with the character codes.

Step S910: Using the character codes and font information obtained through the character recognition and font recognition, and using individual outline data prepared in advance, each character is converted into the vector data. If the input image is color, the color of each character is extracted from the color image to be recorded with the vector data.

Step S911: By handling the characters in the same manner as common graphics, the character is made an outline. In other words, as for the characters that are very likely to be mistaken, the vector data of the outline having visible fidelity to the image data is generated.

Step S912: Unless the specified area is the text area rectangular block, the vectorizing processing is executed in accordance with the contour of the image.

The foregoing processing makes it possible to convert the image information belonging to the text area rectangular block to the vector data with considerable fidelity to the original shape, size and color.

[Vectorization of Graphics Area]

At step S302, if a decision is made that the area is other than the text area rectangular block, that is, a graphics area rectangular block, the contour of the black cluster of pixels extracted from within the specified area is converted into vector data.

In the vectorization of an area other than the text area, to express a line drawing and the like in a combination of straight lines and/or curved lines, an "angle" is detected which divides a curved line into a plurality of sections (pixel sequence). The term "angle" refers to a point at which the curvature has a local maximum. For example, a decision as to whether the pixel Pi on the curved line shown in FIG. 10 is an angle or not is made as follows.

More specifically, assuming Pi as the starting point, pixels Pi−k and Pi+k, which are separated from Pi by the predetermined number (k, here) of pixels in both directions along the curved line, are connected by a line segment L. Assume that the distance between the pixels Pi−k and Pi+k is d1, the distance between the line segment L and the pixel Pi is d2, and the length of the arc of the curved line between the pixels Pi−k and Pi+k is A. When the distance d2 becomes the local maximum, or the ratio (d1/A) becomes equal to or less than a threshold, a decision is made that the pixel Pi is an angle.

The pixel sequence separated by the angle is approximated by straight lines or curved lines. The approximation to straight lines is made by the least squares method or the like, and the approximation to curved lines is made using a cubic spline function or the like. The pixel at the angle that divides the pixel sequence becomes the beginning or end of the approximate straight lines or approximate straight curved lines.

In addition, a decision is made as to whether an internal contour of a white cluster of pixels is present or not within the vectorized contour. If the internal contour is present, the contour is vectorized, followed by recursively vectorizing an internal contour of the inversion pixels such as an internal contour of the internal contour.

As described above, the outline of a figure with any given shape can be vectorized using piecewise approximation of the contour. When there is a colored manuscript, colors of figures are extracted from the color image, and the extracted color information is recorded with the vector data.

As shown in FIG. 11, when an external contour PRj is close to an internal contour PRj+1 or to another external contour in a certain section of interest, the two or a plurality of contour lines are combined so that they can be expressed as a line having a thickness. For example, when the distance PQi from each pixel Pi on the contour PRj+1 to the closest pixel Qi on the contour PRj is calculated, and if the distance PQi has small variations, the section of interest can be approximated by straight lines or curved lines connecting the point sequence of the middle points Mi between the pixels Pi and Qi. The thickness of the approximate straight lines or approximate curved lines is made the average value of the distance PQi, for example.

As for ruled lines of a list, which comprise lines or an aggregate of lines, they can be expressed by vectors efficiently by making them a set of lines having thickness.

After the contour combining processing, the entire processing is completed.

As for a photographic area rectangular block, it is maintained as the image data without being vectorized.

[Graphic Recognition]

After the outlines of the line figures and the like are vectorized as described above, the vectorized piecewise lines are grouped for each graphic object.

The individual steps of FIG. 12, which will be described below, show the processing of grouping the vector data for each graphic object.

Step S1201: First, the starting point and final point of each vector data are calculated.

Step S1202 (Graphics Element Detection): A graphics element is detected using the starting point and final point information obtained at step S1201. The term "graphics element" refers to a closed figure consisting of piecewise lines, and when detecting it, the vectors are linked at the pixel at the common angle constituting the starting point and final point. In other words, the principle is applied that the individual vectors constituting a closed shape have vectors linked to each other at their both ends.

Step S1203: Next, the other graphics elements or piecewise lines within the graphics element are grouped into a single graphic object. In addition, unless the other graphics elements or piecewise lines are present within the graphics element, the graphics element is made a graphic object.

[Detection of Graphics Element]

The processing at the foregoing step S1202 (graphics element detection) is executed by the individual steps of FIG. 13 in a concrete way.

Step S1301: First, unnecessary vectors without having their both ends linked are eliminated from the vector data so as to extract the vectors constituting a closed figure.

Step S1302: Next, as for the vectors constituting the closed figure, an end (the starting point or final point) of any one of the vectors is added as the beginning point, and the vectors are searched for successively in one direction, in a clockwise direction, for example. More specifically, a first end of the next vector is searched for at a second end of the current vector so that the closest linked end within a predetermined distance is made a first end of the linked vector. After making a round of the vectors constituting the closed figure and returning to the beginning point, all the vectors passed by are grouped as a closed figure constituting a single graphics element. In addition, all the vectors constituting a closed figure within the closed figure are also grouped.

Furthermore, the same processing is repeated by adding the starting point of a vector not yet grouped as a beginning point.

Step S1303: Finally, from among the unnecessary vectors eliminated at step S1301, a vector is detected whose end is close to the vectors grouped as the closed figure at step S1302 so that it is grouped into the single graphics element.

The processing described above enables the graphic block to be handled as a reusable individual graphic object.

[BOX Saving Processing]

Next, details of the BOX saving at step S306 as described above will be explained.

After the object division step (step S301) of FIG. 3, the conversion processing to BOX saving data is executed using the data obtained as a result of the vectorizing (step S304). In the present embodiment, the vectorizing processing result at step S304 is saved in an intermediate data format as shown in FIG. 14, that is, in a format called a document analysis output format (abbreviated to DAOF, from now on).

In FIG. 14, the DAOF comprises a header 1401, a layout description data section 1402, a character recognition description data section 1403, a list description data section 1404, and an image description data section 1405.

The header 1401 retains information on the input image of the processing target.

The layout description data section 1402 retains information such as text, a line drawing, drawing, list and photograph, which are attributes of rectangular blocks in the input image, and the position information of each rectangular block in which the attributes are recognized.

The character recognition description data section 1403 retains character recognition results obtained by recognizing characters in the text area rectangular block.

The list description data section 1404 stores details of the list structure in the graphics area rectangular block having the attribute of a list.

The image description data section 1405 retains the image data in the graphics area rectangular block by cutting out the image data from the input image data.

As to a block obtained by the vectorizing processing in a specified area as to which the vectorizing processing is instructed, the image description data section 1405 retains a set of data representing the internal structure of the block, the shape of the image, the character codes and the like.

On the other hand, as for a rectangular block other than that in the specified area, which is out of a vectorizing processing target, the input image data itself is retained.

The conversion processing to the BOX saving data will now be described with reference to FIGS. 15-18.

The conversion processing to the BOX saving data is executed by the individual steps shown in FIG. 15.

Step S1501 (FIG. 15): Input DAOF format data.

Step S1502: Generate the document structure tree that will become a source of application data.

Step S1503: Acquire actual data within the DAOF from the document structure tree, and generate the real application data.

The document structure tree generating processing at step S1502 is executed by the individual steps of FIG. 16. As the basic rule of the total control in the processing of FIG. 16, the flow of the processing proceeds from a micro-block (single rectangular block) to a macro-block (an aggregate of the rectangular blocks). It is assumed in the following description that the term "rectangular block" means both the micro-block and macro-block.

Step S1601 (FIG. 16): According to the relationships in the vertical direction, the rectangular blocks are regrouped on a block by block basis. Although the processing of FIG. 16 is sometimes executed repeatedly, the decision is made on a micro-block by micro-block basis immediately after starting the processing.

Here, the term "relationships" is defined by features such as that the distance between the rectangular blocks is close each other and the block width of the rectangular blocks (height in the case of horizontal direction) is nearly equal to each other. In addition, the information such as distance, width and height is extracted by referring to the DAOF.

In the image data of FIG. 17 shown as an example, rectangular blocks T1 and T2 are placed side by side in the horizontal direction at the top of image. Under the rectangular blocks T1 and T2, a horizontal separator 51 is placed, and under the horizontal separator 51, there are rectangular blocks T3, T4, T5, T6 and T7.

The rectangular blocks T3, T4 and T5 are arranged in the vertical direction from top to bottom in the left half portion in a region under the horizontal separator S1. Likewise, the rectangular blocks T6 and T7 are arranged from top to bottom in the right half portion in the region under the horizontal separator S1.

As for such image data, grouping processing at step S1601 based on the relationships in the vertical direction is executed. Thus, the rectangular blocks T3, T4 and T5 are collected into a single group (rectangular block) V1, and the rectangular blocks T6 and T7 are collected into a single group (rectangular block) V2. The groups V1 and V2 belong to the same hierarchy.

Step S1602: Check the presence or absence of a separator in the vertical direction. The separator is an object having a line attribute in the DAOF, and has a function of dividing the blocks clearly in the application software. When the vertical separator is detected, the input image area is divided into right and left using the separator as the boundary between them in the hierarchy of the processing target. In the example of FIG. 17, there is no separator in the vertical direction.

Step S1603: Make a decision as to whether the sum total of the group heights in the vertical direction becomes equal to the height of the input image. More specifically, when grouping in the horizontal direction while moving through the area of the processing target in the vertical direction (from top to bottom, for example), the end decision of the processing is made by using the fact that the sum total of the group heights becomes equal to the height of the input image when the processing of the entire input image is completed. When the grouping ends, the processing is completed. Unless the grouping ends, the processing proceeds to step S1604.

Step S1604: Execute grouping processing in accordance with the relationships in the horizontal direction. By the processing, the rectangular blocks T1 and T2 are collected into a single group (rectangular block) H1, and the rectangular blocks V1 and V2 are collected into a single group (rectangular block) H2. The groups H1 and H2 come to the same hierarchy. In this case also, the decision is made on a micro-block by micro-block basis immediately after starting the processing.

Step S1605: Check the presence or absence of a separator in the horizontal direction. When the separator is detected, the input image area is divided into upper and lower portions using the separator as the boundary between them in the hierarchy of the processing target. In FIG. 17, there is the separator S1 in the horizontal direction.

The foregoing processing results are recorded as a tree shown in FIG. 18.

In FIG. 18, the input image V0 has the groups H1 and H2 and the separator S1 in the highest hierarchy, and the group H1 includes the rectangular blocks T1 and T2 in the second hierarchy. The group H2 includes the second hierarchy groups V1 and V2. The group V1 includes the third hierarchy rectangular blocks T3, T4 and T5, and the group V2 includes the third hierarchy rectangular blocks T6 and T7.

Step S1606: Make a decision as to whether the sum total of the group lengths in the horizontal direction becomes equal to the width of the input image or not. Thus, the end of the grouping in the horizontal direction is decided. If the group length in the horizontal direction becomes equal to the page width, the document structure tree generating processing is completed. Unless the group length in the horizontal direction becomes equal to the page width, the processing returns to step S1601 to repeat checking the relationships in the vertical direction at the hierarchy one step higher.

[Display Method]

Next, details of the display on the UI mentioned at step S307 of FIG. 3 will be described with reference to FIGS. 20-24.

Figure 20:
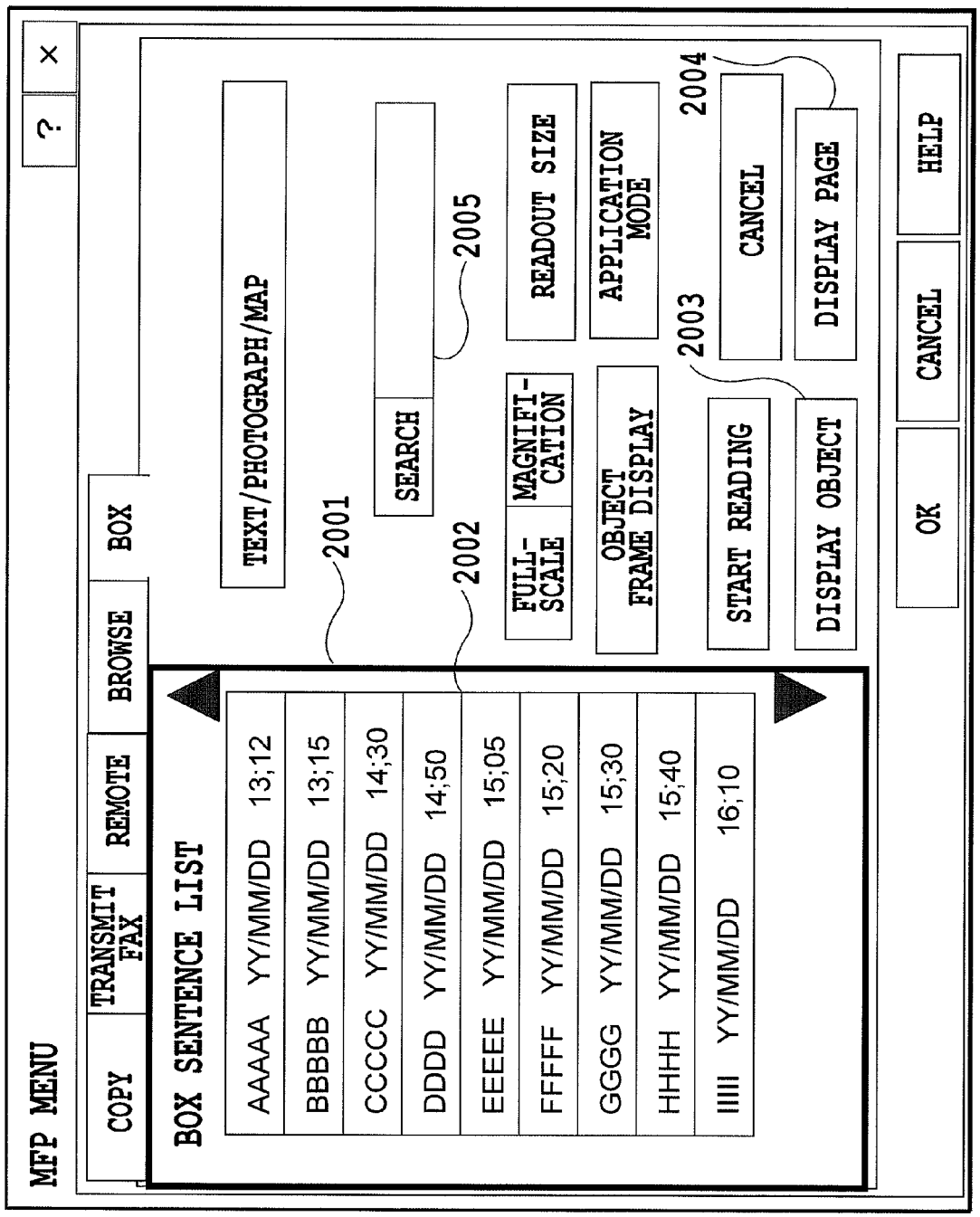
FIG. 20 is a diagram showing an example of a UI display at step S307 of FIG. 3 which will be described in the embodiment 1.

FIG. 20 shows an example of the user interface. The user interface is an example of the display unit 116 the MFP 100 has. The user interface, however, is not limited to it. For example, it can be a display unit such as a Remote UI that displays by using an application installed in the management PC 101 or local PC 102 connected via the network.

In FIG. 20, a block 2001 displays data saved in the BOX. As designated by reference numeral 2002, each sentence is added to a name, and information on the input time and the like is also displayed. To perform the object division display, a manuscript is selected in the block 2001, and an object display button 2003 is pushed down to change the display, which will be described later. In addition, the display is also changed by selecting the manuscript in the block 2001 and by pressing a page display button 2004, which will be described later as well.

Figure 21:
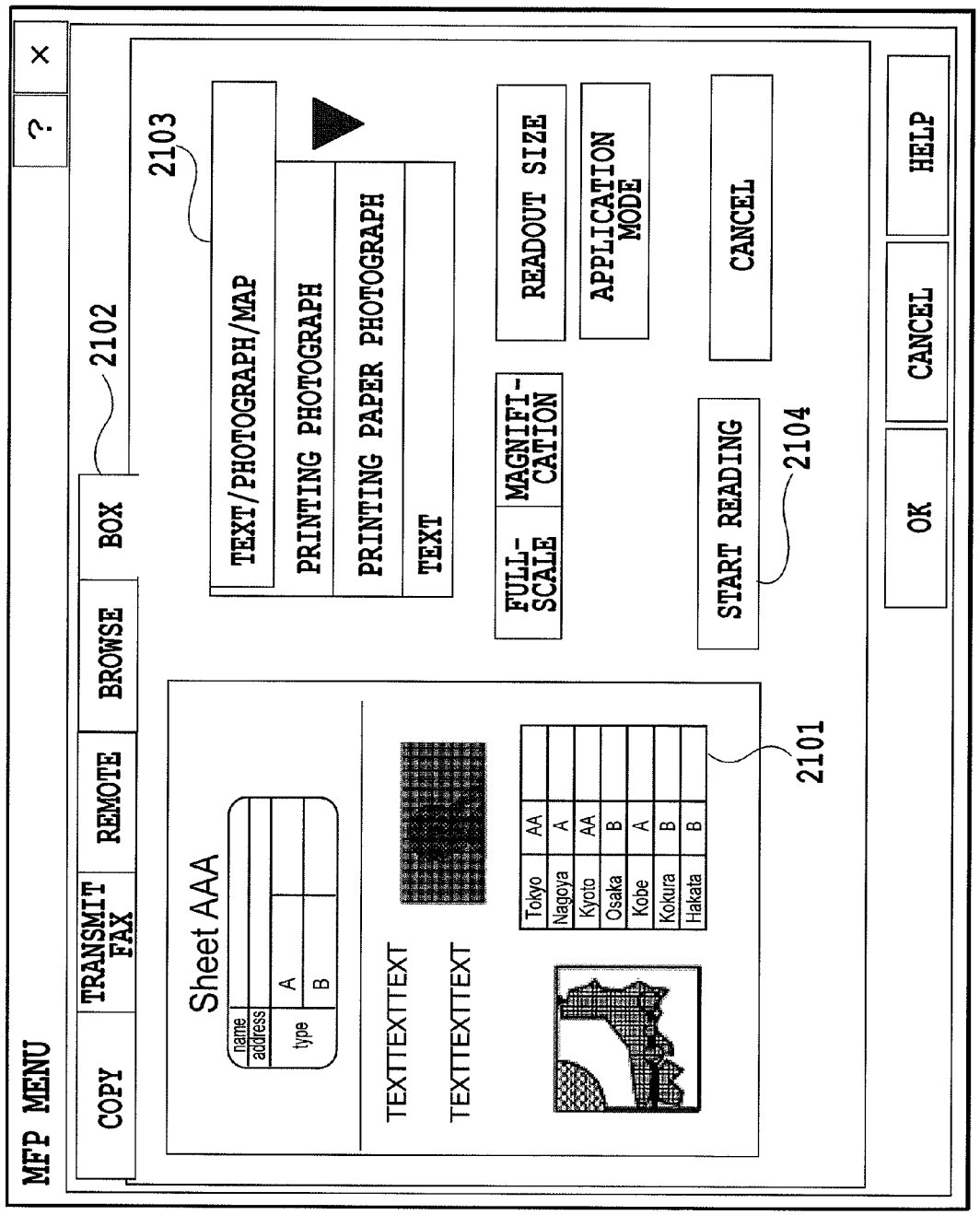
FIG. 21 is a diagram showing an example of a page display of the UI display at step S307 of FIG. 3 which will be described in the embodiment 1.

FIG. 21 shows another example of the user interface. A block 2101 of FIG. 21 displays the contents of the data stored in the BOX at the foregoing step S306. The user interface can display a reduced image of the raster image, or can display using SVG described before. In other words, it is enough for the user interface to display a whole page in accordance with the foregoing data.

Reference numeral 2102 designates tabs for selecting the functions of the MFP. Pushing down one of the tabs makes it possible to select one of the functions of the MFP such as copying, transmission, remote operation, browser or BOX. It goes without saying that similar display is possible for other functions.

Reference numeral 2103 designates a list display for selecting a manuscript mode, in which the user can select the manuscript mode at the time of reading the manuscript. This is to make a selection to switch the image processing in accordance with the manuscript type. Modes other than those shown here can also be displayed and selected in the same manner. Reference numeral 2104 designates a manuscript read starting button. Depressing the button can start the scanner to read the image. Although the read starting button is placed within the screen in this example, it is also possible to start reading with a start button provided separately.

Figure 22:
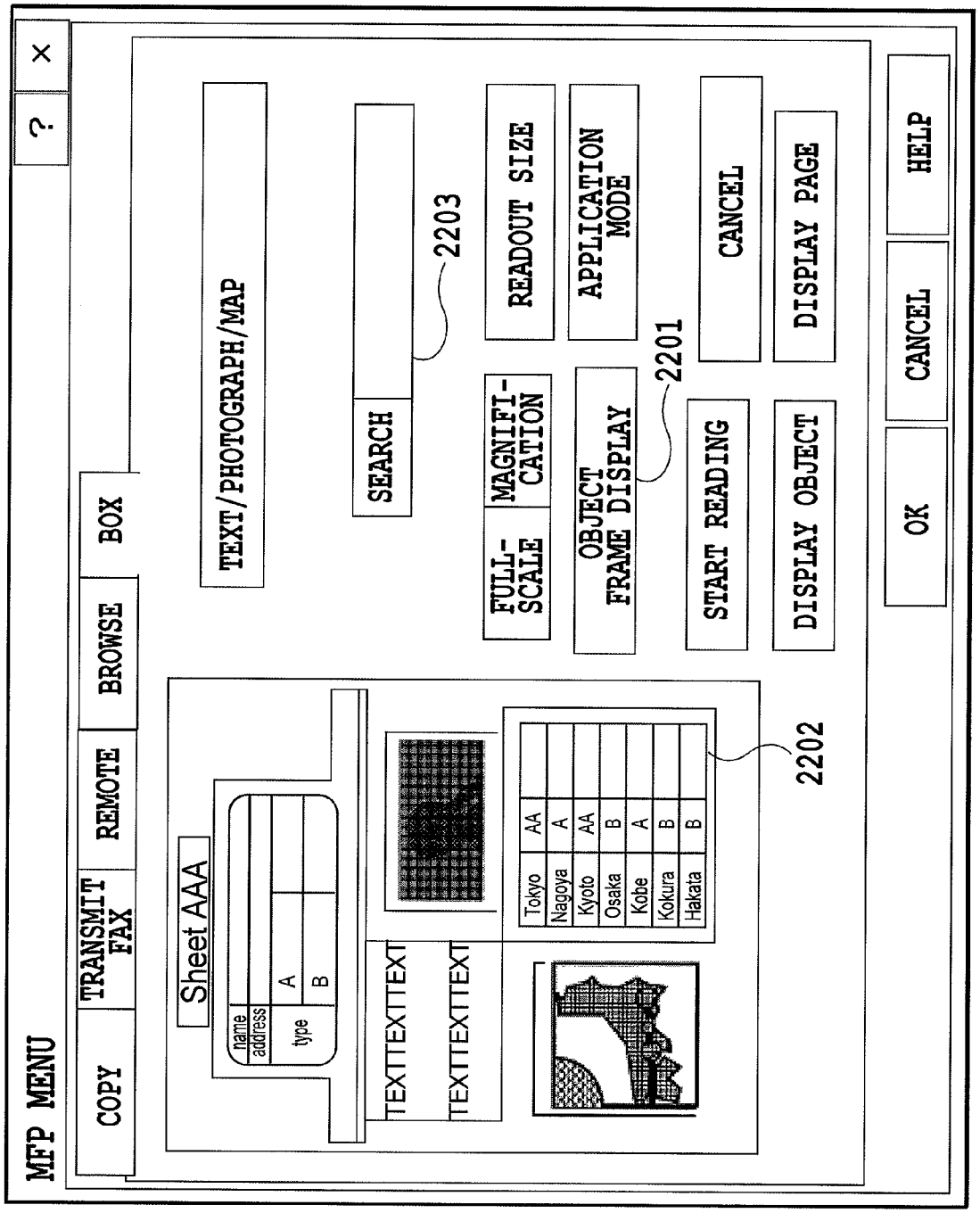
FIG. 22 is a diagram showing an example of an object attribute display of the UI display at step S307 of FIG. 3 which will be described in the embodiment 1.

An example of the user interface shown in FIG. 22 displays a frame for each object to enable the user to see the result of the object division. Depressing the button 2201 causes the page display window 2202 to display the frames of the individual objects. It displays the objects in such a manner that the user can clearly distinguish them by adding colors to the frames or by using lines different in thickness or in type such as dotted line or broken line. There are text, drawing, line drawing, list, photograph and the like as objects described above.

Reference numeral 2203 designates a block used for inputting characters for making a search. Inputting a character string here and carrying out a search make it possible to search for an object or a page including the object. A well-known searching technique based on the metadata described above is used to search for the object or page. Then, the object or page searched for is displayed.

Figure 23:
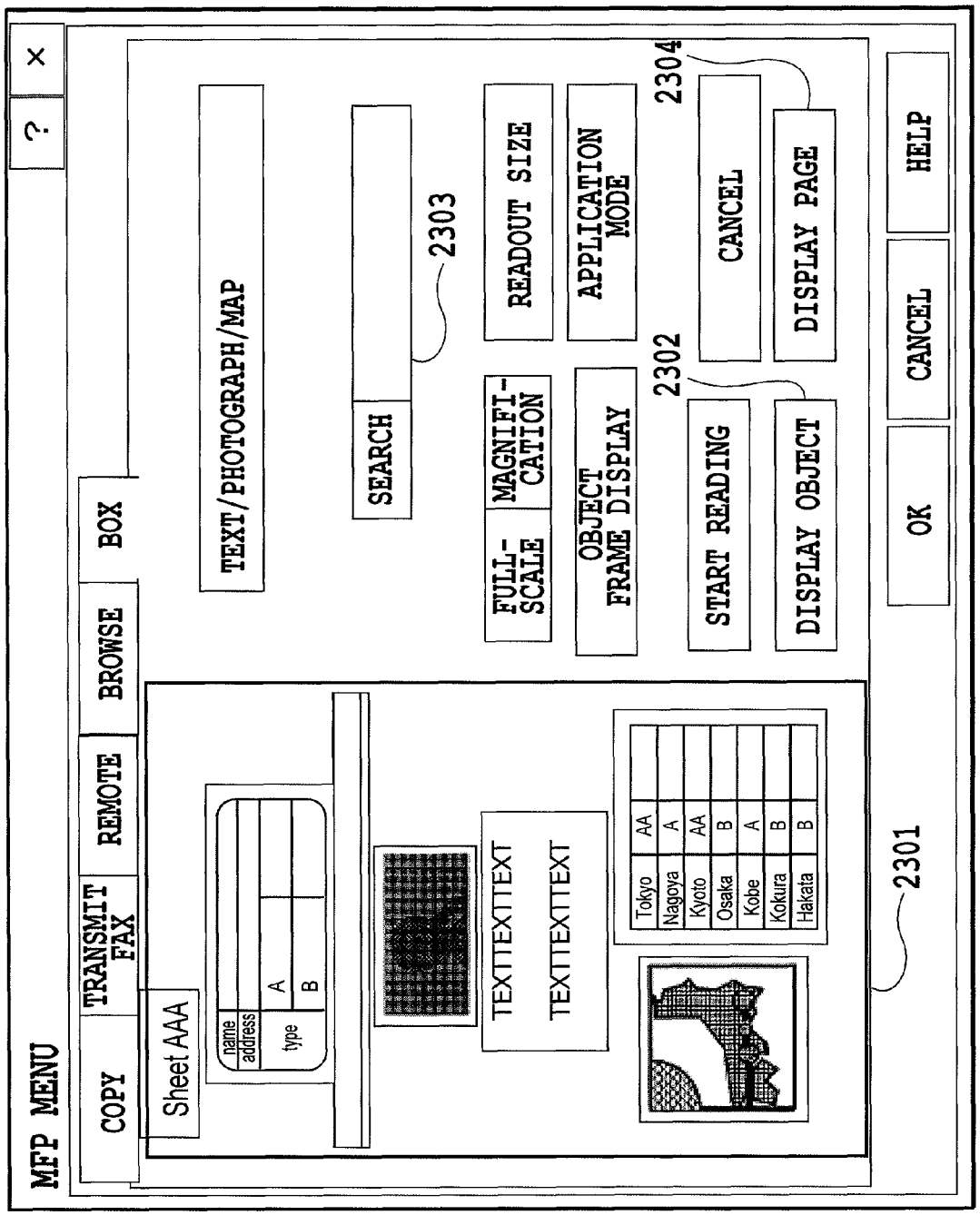
FIG. 23 is a diagram showing an example of displaying one of the divided objects in the UI display at step S307 of FIG. 3 which will be described in the embodiment 1.

FIG. 23 is an example of objects within a page displayed in response to a press of the "object display" 2302. As shown in the window 2301, there is no concept of a page, and individual objects are displayed as separate parts. In addition, pressing the page display button 2304 makes it possible to switch the display in such a manner as to show them as an image on one page.

In addition, reference numeral 2303 designates a block used for inputting characters for making a search. Inputting a character string here and carrying out a search make it possible to search for an object or a page including the object. A well-known searching technique based on the metadata described above is used to search for the object or page. Then, the object or page searched for is displayed.

Figure 24:
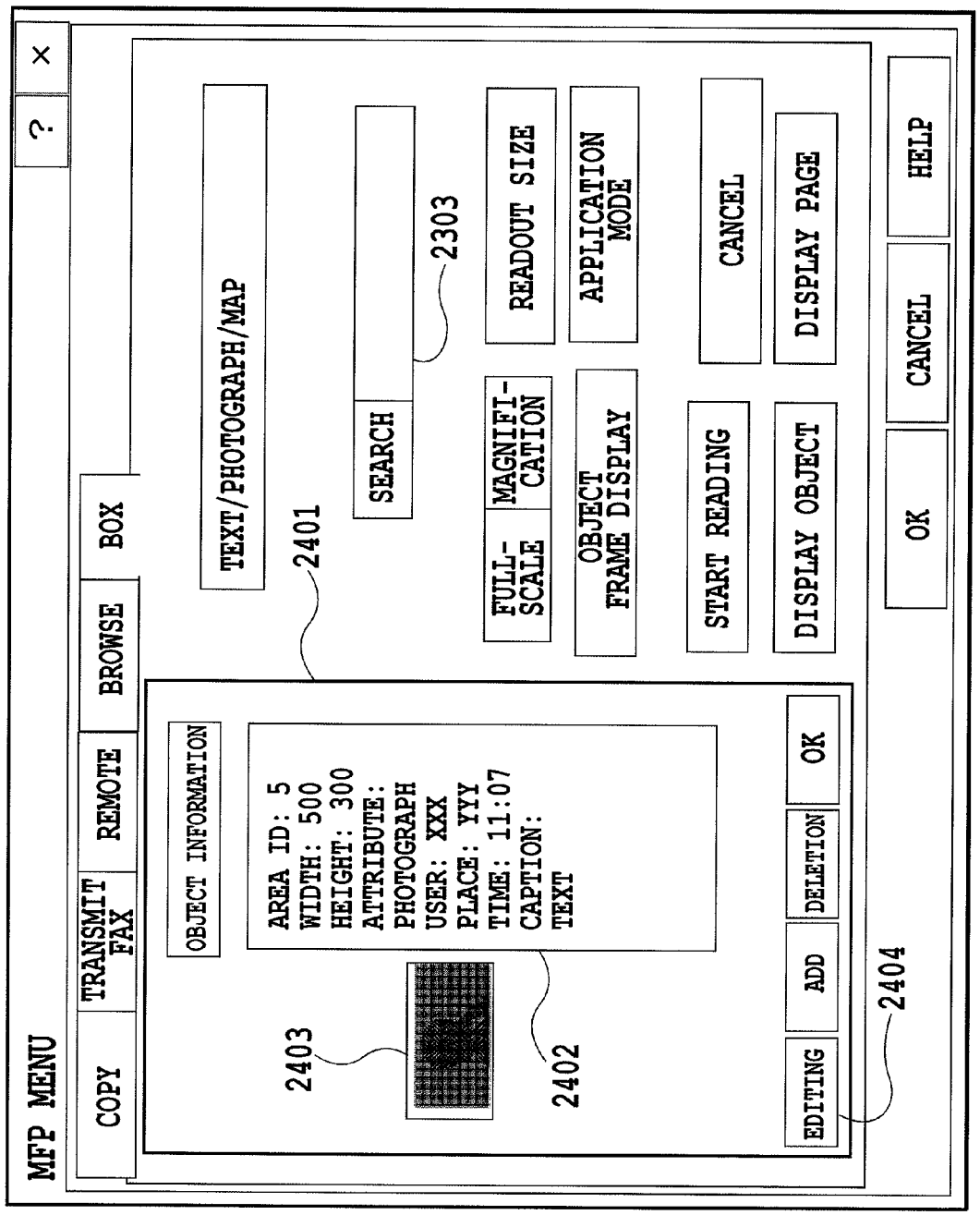
FIG. 24 is a diagram showing an example of an object and meta-information in the UI display at step S307 of FIG. 3 which will be described in the embodiment 1.

FIG. 24 is an example of a screen displaying the metadata of an object. Selecting a particular object enables display of the image 2403 of the object and its metadata 2402 described before. The metadata shows, as the information on the object, the area ID, width, height, attribute, user information, information on the installation place of the MFP, input time, caption and the like. In this example, the object has a photographic attribute, and is displayed with only a noun that is extracted from the OCR information on the text object near the photographic object using the morphological analysis. The noun corresponds to the character string "TEXT" shown in FIG. 24.

In addition, individual buttons designated by the reference numeral 2404 make it possible to perform editing of, adding to and deleting from the metadata. Furthermore, reference numeral 2405 designates a block used for inputting characters for making a search. Inputting a character string here and carrying out a search make it possible to search for an object or a page including the object. A well-known searching technique based on the metadata described above is used to search for the object or page. Then, the object or page searched for is displayed.

[Editing of Metadata]

Next, editing of the metadata carried out by the selecting unit 137, metadata analyzing unit 138, metadata update procedure determining unit 139, and metadata update unit 140 shown in the foregoing FIG. 41 will be described in detail with reference to FIGS. 25-34.

Figure 25:
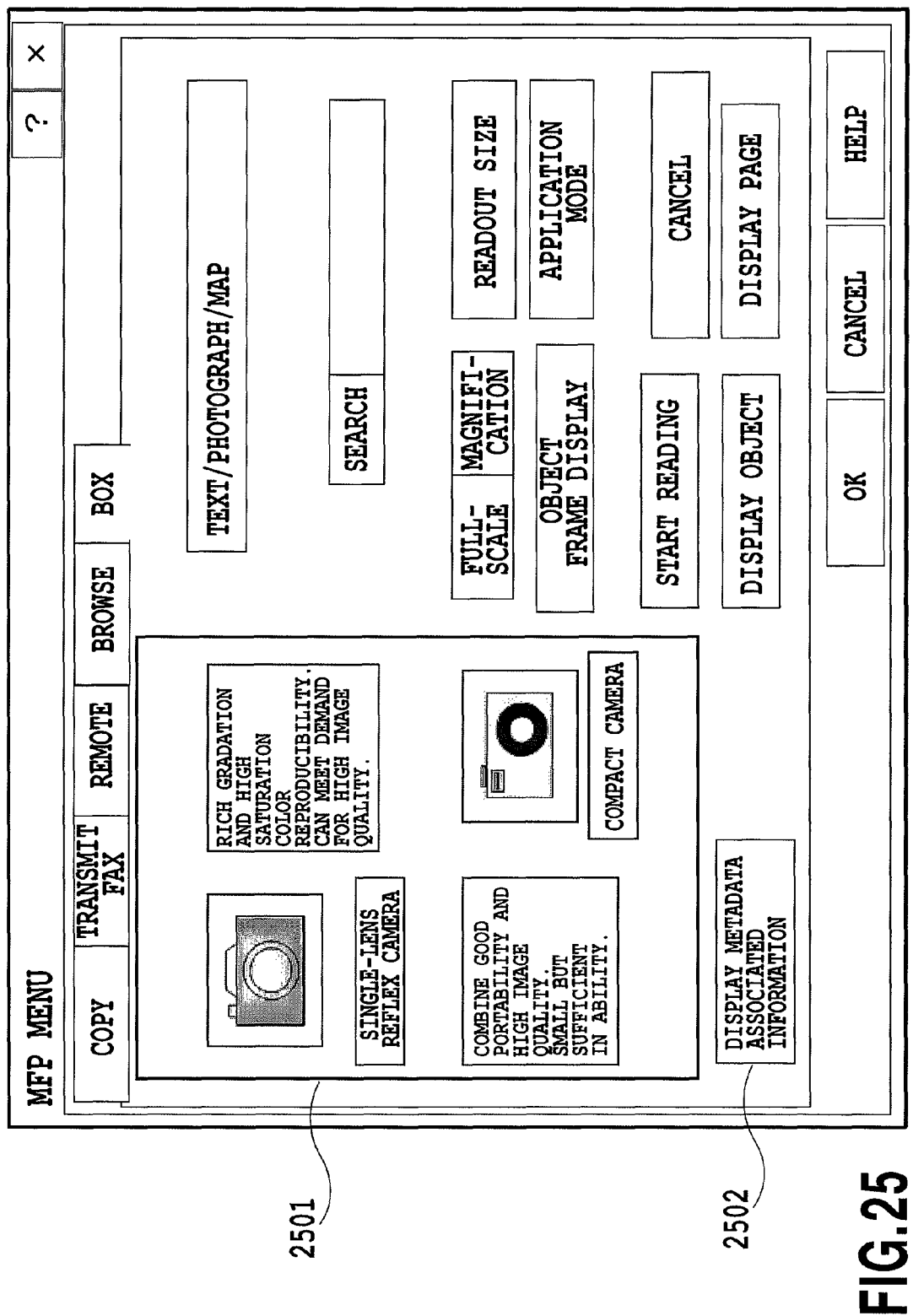
FIG. 25 is a diagram showing a first example of a UI screen of metadata editing which will be described in the embodiment 1.

FIG. 25 is an example of the metadata editing screen of the present embodiment, which does not require any keyboard input. Although the metadata editing is possible on any one of the screens of the foregoing FIGS. 21-23, the screen of FIG. 22, which displays frames for the individual objects to clarify the result of the object division, is desirable because it facilitates user understanding. Thus, FIG. 25 displays the frames for the individual objects in the same manner as FIG. 22.

The user selects one of the objects on the screen with a touch pen or mouse, and performs the metadata editing by dragging and dropping the selected object onto another object.

Figure 26:
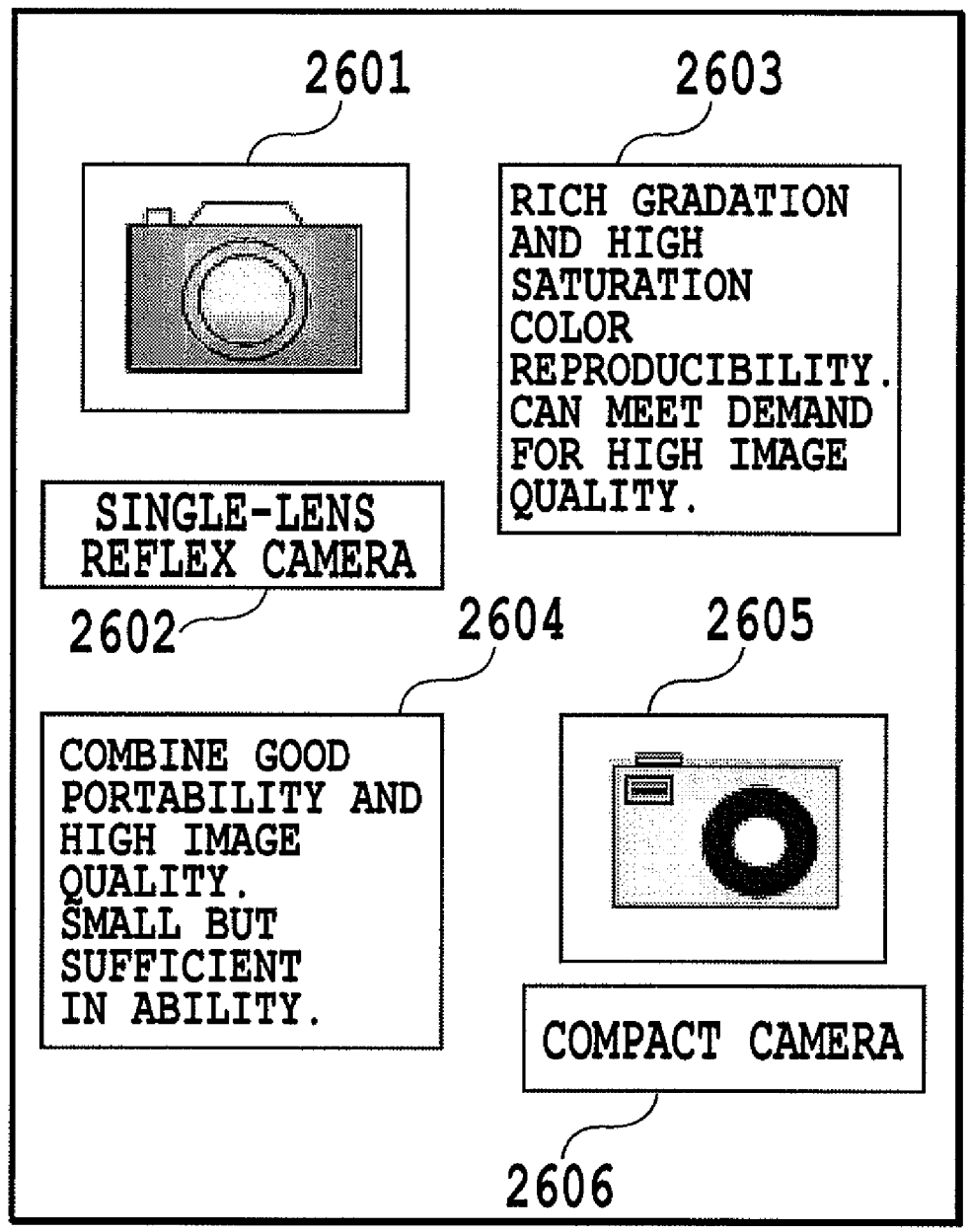
FIG. 26 is a diagram showing an enlarged view of the UI screen of the metadata editing which will be described in the embodiment 1.

FIG. 26 is an enlarged diagram of the window 2501 of FIG. 25. First, the metadata of the objects 2601-2606 will be described with reference to blocks 2701-2706 of FIG. 27.

The blocks 2701-2706 of FIG. 27 show the data format of the metadata of the individual objects 2601-2606. Here, the data format of the metadata generally employs a markup language using "tags" such as a SVG data format described before or an XML data format. Accordingly, the present embodiment also uses the markup language to describe the data format of the metadata. The data format of the metadata can be displayed on the screen after being converted to the data format for display as described before with reference to FIG. 24.

The data format of the metadata will be described with reference to the block 2701 of FIG. 27 below.

The symbol <id>1</id> is data designating the area ID of the object 2601, and is data for displaying the area ID shown in FIG. 24.

The symbol <attribute>photograph</attribute> represents data designating the attribute of the object 2601, and shows that the object 2601 has a photographic attribute. There are other attributes such as text and graphics, one of which is decided at step S301 described before.

The symbol <width>W1</width> represents data designating the width of the object 2601, and is data for displaying the width shown in FIG. 24.

The symbol <height>H1</height> represents data designating the height of the object 2601, and is data for displaying the height shown in FIG. 24.

The symbol <job>PDL</job> designates a job class of the object 2601. For example, when inputting via the image reading unit of the MFP 100 for generating the bitmap data as described before, the job class becomes SCAN. In addition, when the application software on the PC 102 is used, the job class becomes PDL.

The symbol <user>USER1</user> represents data designating the user information on the object 2601, and is data for displaying the user shown in FIG. 24.

The symbol <place>F Corp. Gth floor</place> represents data designating information about the installation place of the MFP, and is data for displaying the place shown in FIG. 24.

The symbol <time>2007/03/19 17:09</time> represents data designating the time of input, and is data for displaying the time shown in FIG. 24.

The symbol <caption>single-lens reflex camera</caption> represents data designating the caption of the object 2601, and is data for displaying the caption shown in FIG. 24.

Figure 28:
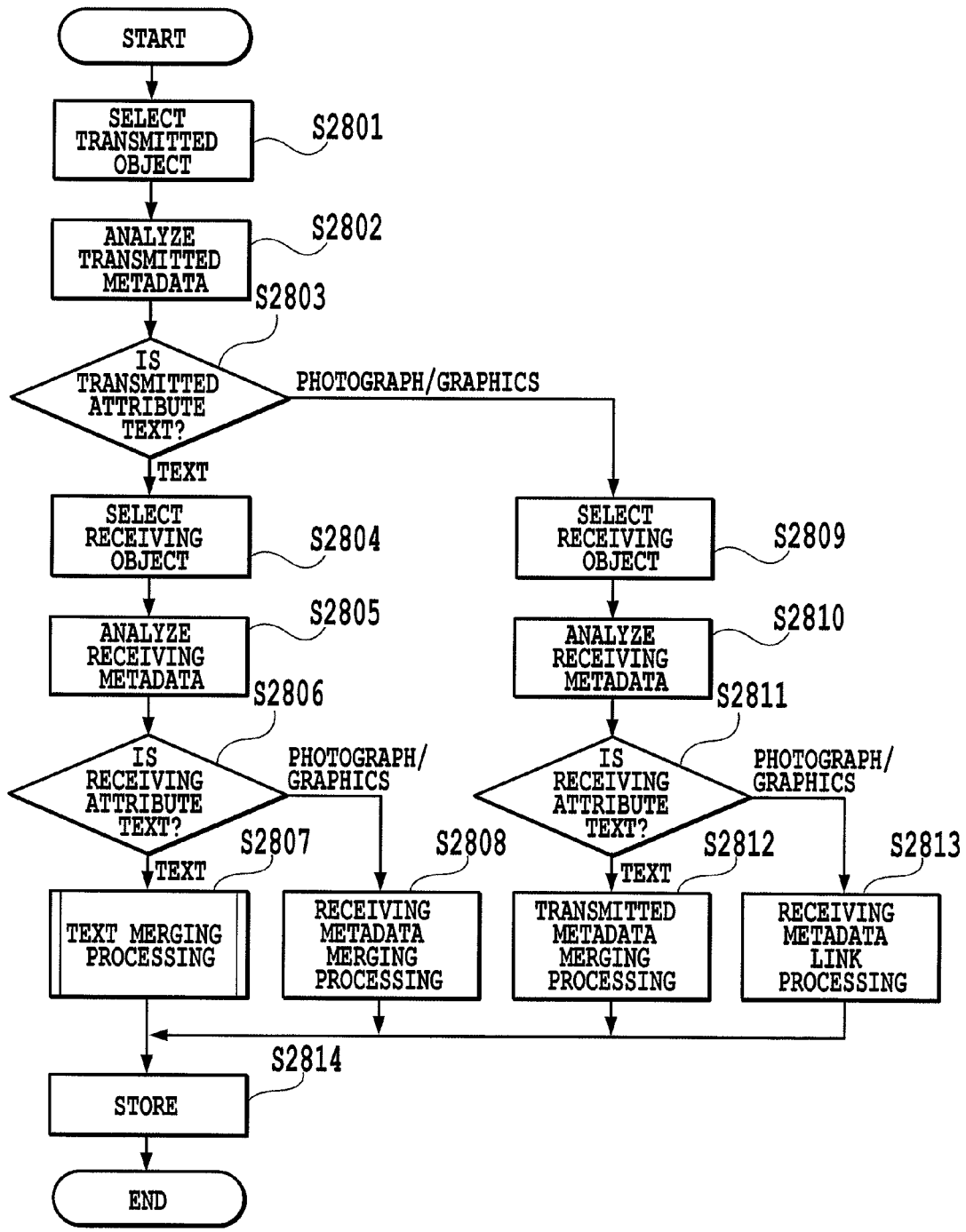
FIG. 28 is a flowchart showing the metadata editing which will be described in the embodiment 1.

Here, referring to FIG. 28, a manner of adding the metadata to the individual objects will be described when the user selects one of the objects on the screen of FIG. 25, and drags and drops the object onto another object.

It is assumed here in the selecting unit 137 described above that a first object the user selects via the operating unit 133 is a transmitted object, and a second object onto which the first object is dragged and dropped is a receiving object.

Figure 29:
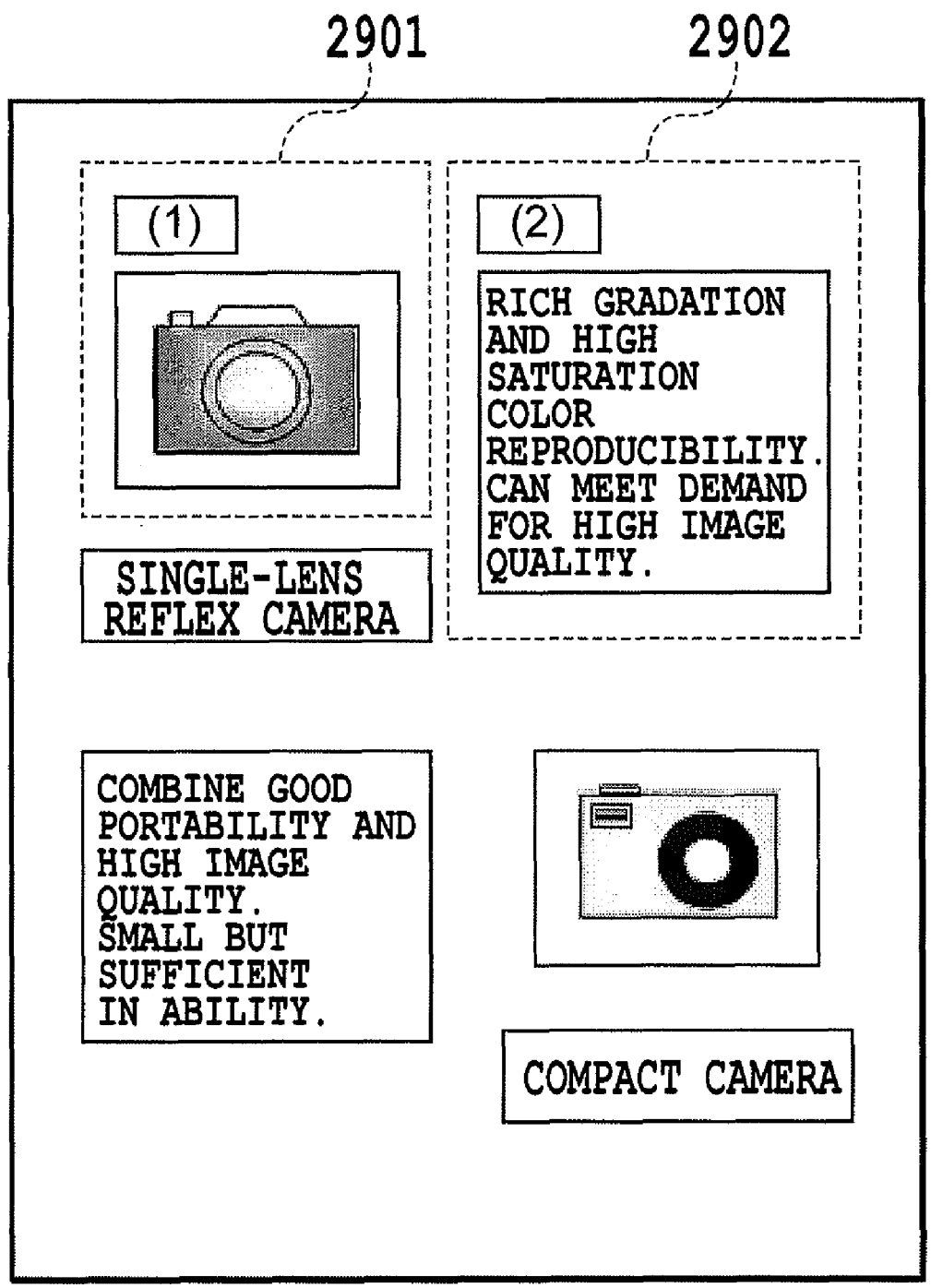
FIG. 29 is a diagram showing a second example of the UI screen of the metadata editing which will be described in the embodiment 1.

In the following, a case will be described in which the transmitted object is dragged and dropped onto the receiving object. However, it is also possible, as shown in FIG. 29, to display the first selected object by adding a number (1) as designated by reference numeral 2901, and the next selected object by adding a number (2) as designated by reference numeral 2902. Thus, the operation is not limited to the drag-and-drop operation when using the user interface (object association component) capable of clearly showing the relationships between the two objects such as attaching (1) to the transmitted object and (2) to the receiving object.

First, a case where the user drags and drops the object 2603 onto the object 2601 will be described. In this case, the object 2603 becomes the transmitted object and the object 2601 becomes the receiving object as described before.

First, at step S2801, the object 2603 is selected as a transmitted object.

Next, at step S2802, the metadata analysis of the transmitted object selected at step S2801 is carried out. The metadata analysis refers to the data format of the metadata of the block 2703, and founds that the object 2603 has an attribute <attribute>text</attribute>.

Next, at step S2803, the attribute of the transmitted object is identified. Since the attribute of the transmitted object is text, the processing proceeds to step S2804.

Next, at step S2804, the object 2601 is selected as a receiving object. More accurately, since the object 2603 is dragged and dropped onto the object 2601, the object 2601 becomes the receiving object.

Next, at step S2805, the metadata analysis of the receiving object is conducted. The metadata analysis refers to the data format of the metadata of the block 2701 to find that the object 2601 has an attribute <attribute>photograph</attribute>.

Next, at step S2806, the attribute of the receiving object is identified. Here, since the attribute of the receiving object is photograph, the processing proceeds to step S2808.

Next, at step S2808, received metadata merging processing is carried out. Here, since the object 2603 with the text attribute is selected as the transmitted object, and the object 2601 with the photographic attribute is selected as the receiving object, only the metadata 2701 about the object 2601 is updated as designated by the reference numeral 3001 of FIG. 30. By comparing the metadata 2701 with the metadata 3001, it is found that the metadata of a portion "<caption>Rich gradation and high saturation color reproducibility. Can meet demand for high image quality. </caption>" in the block 2703 is added.

Next, the case where the user drags and drops the object 2601 onto the object 2603 will be described. In this case, the object 2601 becomes a transmitted object and the object 2603 becomes a receiving object as described before. Since the attribute of the transmitted object is photographic and the attribute of the receiving object is text, the processing proceeds to step S2812 through the processing described above.

At step S2812, transmitted metadata merging processing is executed. Here, the object 2601 with the photographic attribute is selected as the transmitted object, and the object 2603 with the text attribute is selected as the receiving object. Accordingly, only the metadata 2701 of the object 2601 is updated as designated by the reference numeral 3001 of FIG. 30.

In this way, in the case of editing the metadata, the same metadata editing result can be obtained when dragging and dropping the text object onto the photographic object and when dragging and dropping the photographic object onto the text object.

Next, the case where the user drags and drops the object 2603 onto the object 2602 will be described. In this case, the object 2603 becomes a transmitted object and the object 2602 becomes a receiving object as described before. Since the attribute of the transmitted object is text and the attribute of the receiving object is also text, the processing proceeds to step S2807 through the processing described above.

At step S2807, text merging processing which will be described later is executed. Here, the text merging processing updates the metadata 2702 of the object 2602 to that as designated by reference numeral 3101 of FIG. 31.

Figure 32:
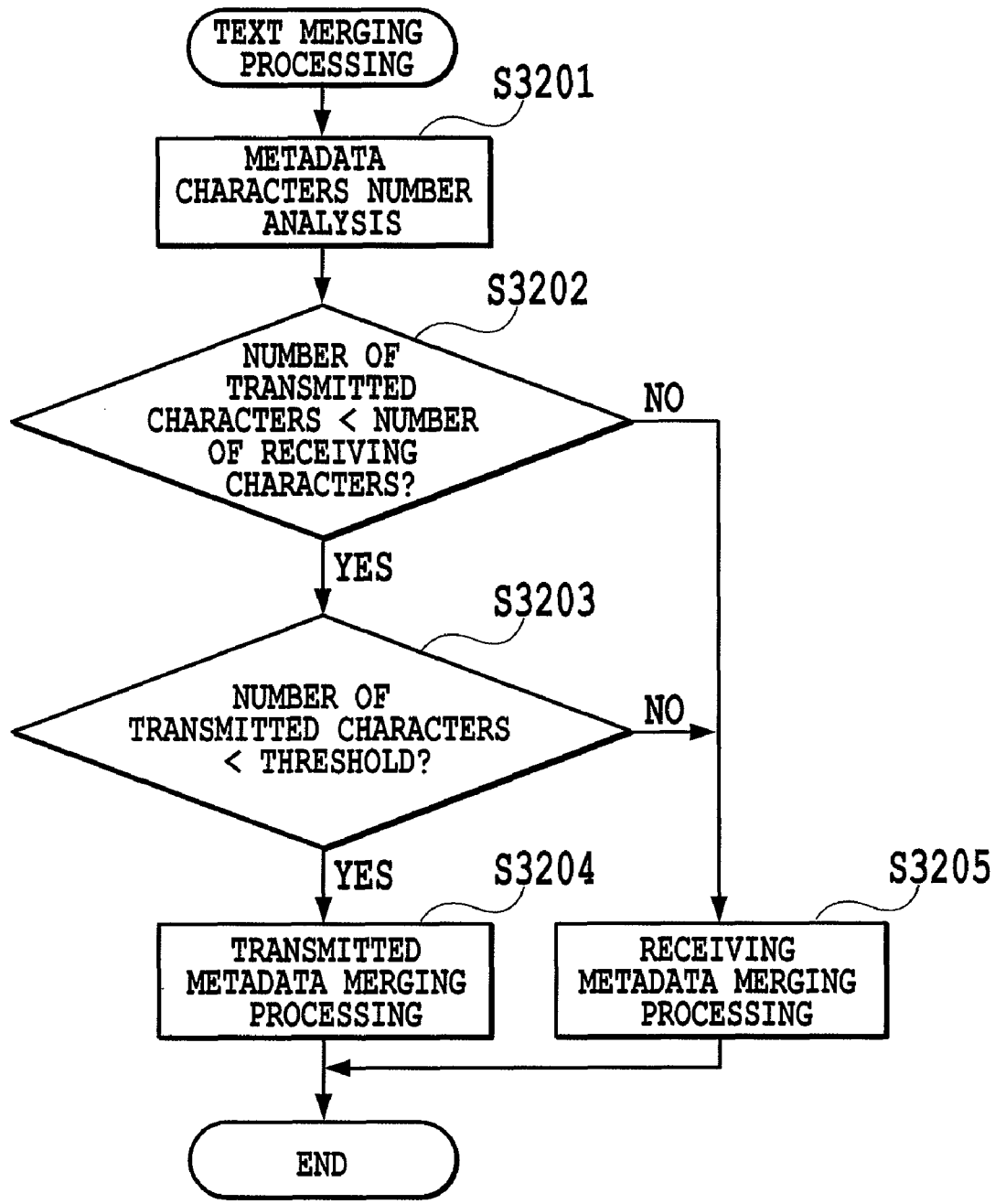
FIG. 32 is a flowchart showing text metadata editing which will be described in the embodiment 1.

FIG. 32 is a flowchart of the foregoing text merging processing executed when both the transmitted object and receiving object have the text attribute. Details of the text merging processing will be described by way of example in which the foregoing transmitted object is the object 2603 and the receiving object is the object 2602.

First, at step S3201, since the object 2603 is selected as the transmitted object and the object 2602 is selected as the receiving object, the metadata 2703 of the transmitted object 2603 and the metadata 2702 of the receiving object 2602 are subjected to metadata character number analysis. The metadata character number analysis obtains the number of characters contained in the caption of the metadata 2703 as the number of transmitted characters and the number of characters contained in the metadata 2702 as the number of receiving characters, respectively. To be concrete, it is found from the caption of the metadata 2703, "<caption>Rich gradation and high saturation color reproducibility. Can meet demand to get high image quality. </caption>", that the number of transmitted characters is 86. Likewise, it is found from the caption of the metadata 2702, <caption>single-lens reflex camera</caption>, that the number of transmitted characters is 23.

Next, at step S202, the number of transmitted characters and the number of receiving characters are compared. Since the number of the transmitted characters is 86 and the number of the receiving characters is 23, the processing proceeds to step S3205.

At step S3205, the metadata 2702 of the receiving object 2602 is updated as the metadata 3101 of FIG. 31.

Next, operation of the foregoing text merging processing will be further described by way of example in which the transmitted object is the object 2606 with the text attribute and the receiving object is the object 2604 with the text attribute.

In this case, at step S3201, the number of the transmitted characters and the number of the receiving characters are obtained from the metadata 2706 of the transmitted object 2606 and the metadata 2704 of receiving object 2604 as described before. Since the caption of the metadata 2706 is <caption>compact camera</caption>, the number of transmitted characters is 13. In addition, since the caption of the metadata 2704 is "<caption>Combine good portability and high image quality. Small but sufficient in ability. </caption>", the number of receiving characters is 70.

Next, at step S3202, the number of the transmitted characters and the number of the receiving characters are compared. Since the number of the transmitted characters is 13 and the number of the receiving characters is 70, the processing proceeds to step S3203.

At step S203, the number of transmitted characters is compared with a preset threshold of the number of characters. In the present embodiment, the threshold of the number of characters is set at 20 as an example. Since the number of the transmitted characters is 13, which is less than the threshold of the number of characters, the processing proceeds to step S3204. In this case, if the number of transmitted characters is not less than the threshold of the number of characters, the processing proceeds to step S3205.

At step S3204, the metadata 2706 of the transmitted object 2606 is updated as the metadata 3301 of FIG. 33.

In this way, when editing the metadata between the text objects, it is possible to edit giving priority to the text object with a smaller number of characters, which is more likely to be reused, by editing the metadata in accordance with a decision result as to the number of characters even in the case of the transmitted object.

Alternatively, it is possible to replace the number of characters described above with the number of words, and compare each number of words in a similar way.

Next, a case will be described where the user drags and drops the object 2601 onto the object 2605.

As described above, the object 2601 becomes a transmitted object and the object 2605 becomes a receiving object. Since the attribute of the transmitted object is photograph and the attribute of the receiving object is also photograph, the processing proceeds to step S2813 via the processing described above. At step S2813, receiving metadata link processing which will be described later is executed. Here, the receiving metadata link processing updates the metadata 2705 of the object 2605 as the metadata 3401 of FIG. 34.

Here, the receiving metadata link processing will be described.

The receiving metadata link processing at step S2813 has the receiving object retain the metadata of the transmitted object as link information. As shown in the foregoing metadata 3401, the address designating the link information to the transmitted object 2601 is retained as <link>ADDRESS1</link>. The term ADDRESS1, which indicates the metadata 2701 of the object 2601, consists of a directory and file name designating the metadata 2701 of the object 2601 stored in the BOX 111 within the MFP 100. When linking to an object saved outside the MFP 100, saved in the database 105, for example, it can include the IP address designating the position of the database 105 on the network.

In this way, when editing the metadata between the two photographic objects, associating of the metadata as the link information makes it possible to maintain the latest state without any concern of the user even when the metadata of the linked transmitted object has been edited. In addition, in the case of conducting a search using the foregoing searching component, if the metadata includes the link information, it goes without saying that the search can utilize the metadata of the linked photographic object, and the user can see the photographic image of the linked object easily. It is also possible to execute the transmitted metadata link processing which has the receiving object retain the metadata of the transmitted object as the link information.

As described above, the image processing method of the present embodiment can add the metadata in such a manner as to facilitate editing of the metadata, to make it easier for the user to understand intuitively, and to facilitate a search afterward.

Embodiment 2

Next, a second embodiment of the image processing method in accordance with the present invention will be described with reference to the accompanying drawings.

In the present embodiment, a method of switching the metadata merging method in accordance with the user information of the associated first and second objects will be described.

Figure 35:
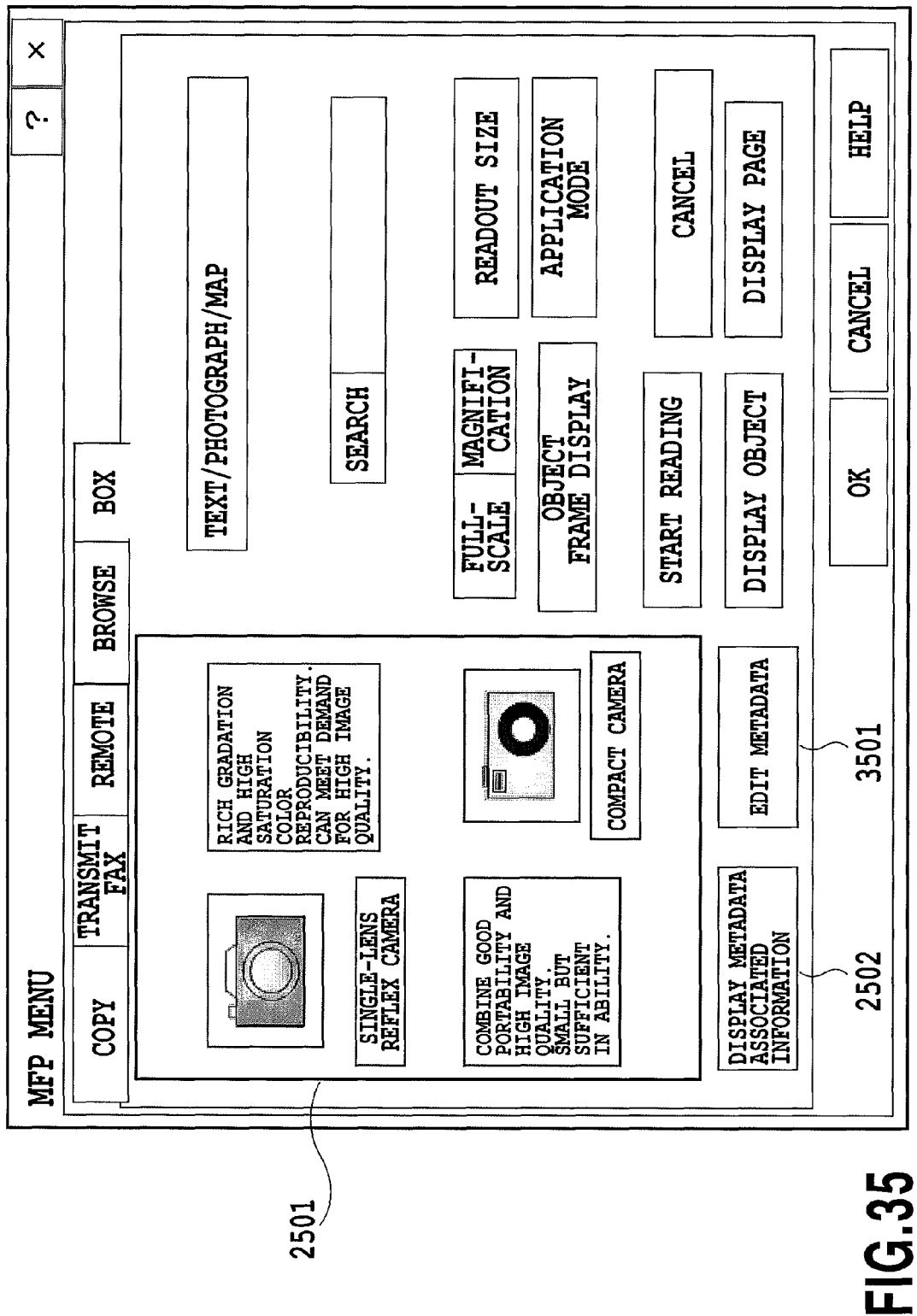
FIG. 35 is a diagram showing a first example of the UI screen of the metadata editing which will be described in an embodiment 2.
Figure 36:
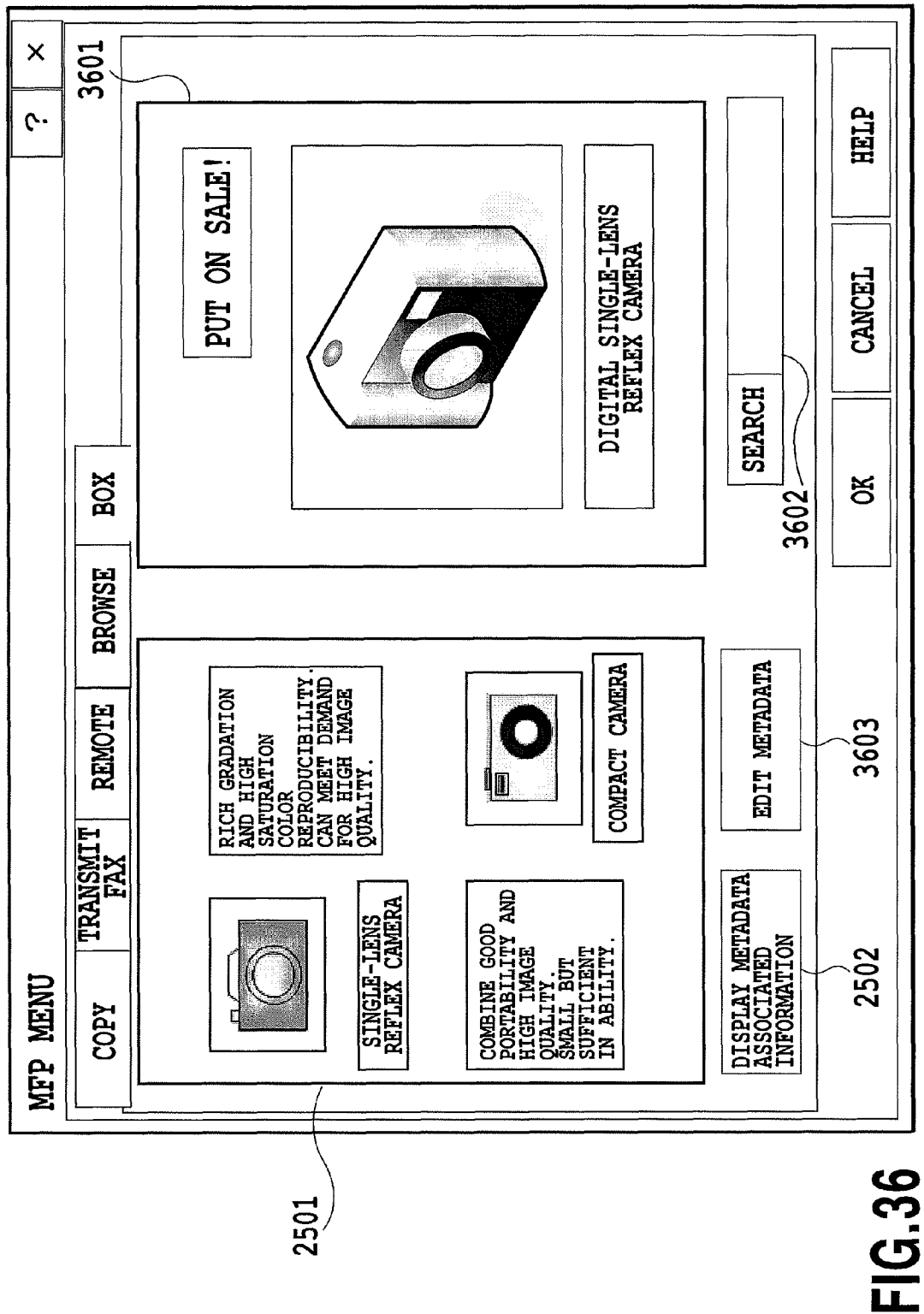
FIG. 36 is a diagram showing the first example of the UI screen of the metadata editing which will be described in an embodiment 2.

FIG. 35 and FIG. 36 are examples of the metadata editing screen in the present embodiment, which does not require any keyboard input. The present embodiment has the same configuration as the first embodiment, and the description thereof will be omitted here.

[Editing of Metadata]

In the same manner as the first embodiment, the present embodiment can conduct metadata editing which will be described in the present embodiment on any one of the screens of FIGS. 21-23. As a screen that makes it easier for a user to understand, the screen of FIG. 22 is desirable which displays each object with a frame to distinguish the result of the object division. Thus, FIG. 35 displays objects with frames in the same manner as FIG. 22.

The user selects one of the objects on the screen with a touch pen or mouse, and conducts metadata editing by dragging and dropping the selected object onto another object. Depressing the button 3501 in FIG. 35 makes it possible to shift the screen to that of FIG. 36 which enables visual metadata editing.

In the same manner as FIG. 35, FIG. 36 enables the user to conduct the metadata editing by dragging and dropping using the touch pen or mouse. Reference numeral 3601 designates a window that displays a page or object searched for by a searching method specified in the block 3602, which will be described later. The block 3602 is displayed to input characters for conducting the search. By inputting a character string and conducting the search, the object or page including the object is searched for. A well-known searching method in accordance with the metadata described above enables the search for the object or page. In addition, depressing the button 3603 makes it possible to return to the editing screen of FIG. 35.

Figure 37:
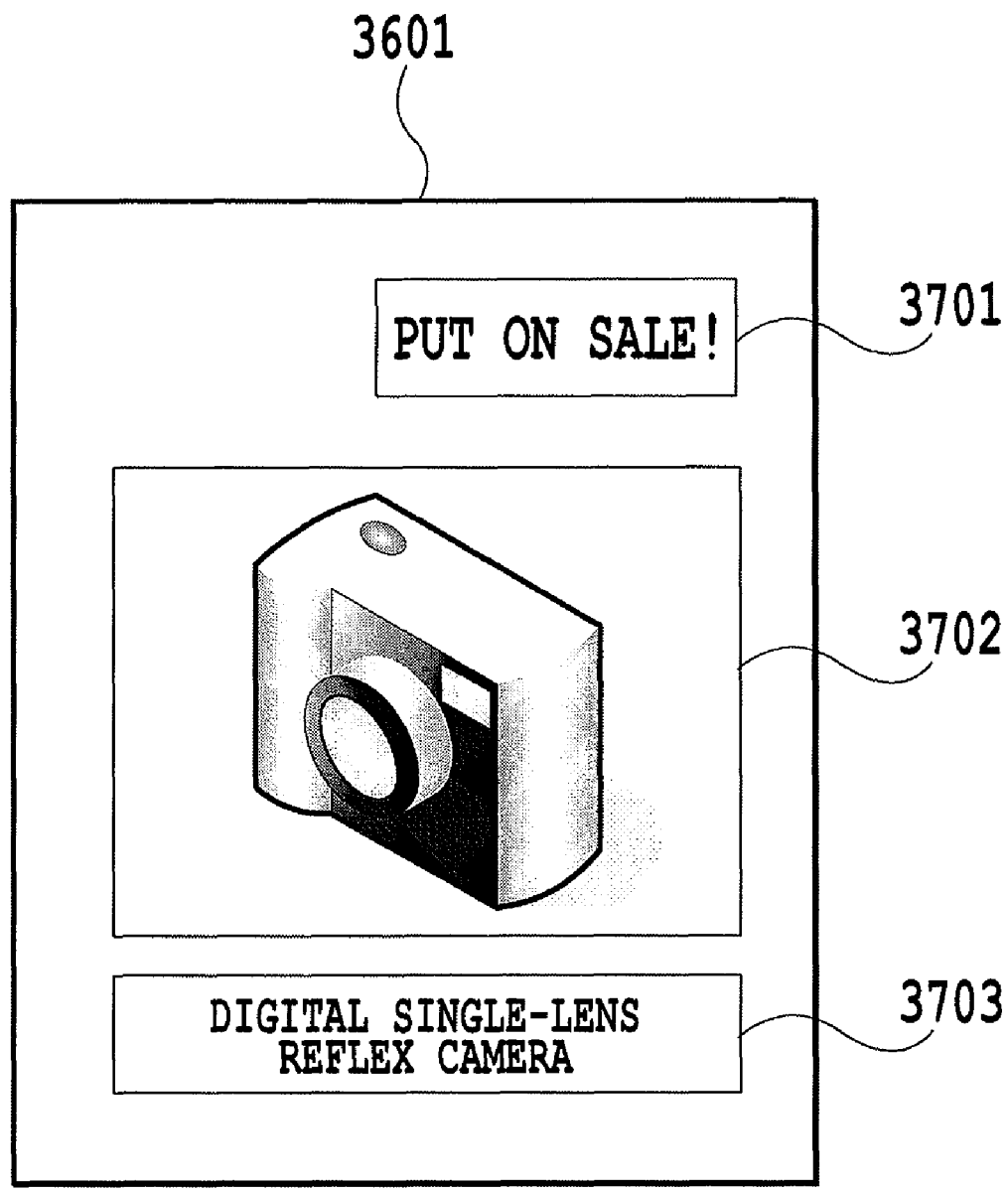
FIG. 37 is a diagram showing an enlarged view of the UI screen of the metadata editing which will be described in the embodiment 2.

FIG. 37 is an enlarged view of the window 3601 of FIG. 36, and FIG. 38 shows metadata 3801, 3802 and 3803 of objects 3701, 3702 and 3703 of FIG. 37. It is found from <user>USER2</user> of the metadata 3701-3703 that the objects 3601-3603 are prepared by a user different from the user of the objects 2601-2606.

Next, the operation in the case of dragging and dropping the first object onto the second object in the present embodiment will be described with reference to FIG. 28 and FIG. 39.

Since the present embodiment differs from the first embodiment only in the drag-and-drop operation between the objects with a photographic attribute, details of the operations other than that will be omitted.

First, a case where the user drags and drops the object 2601 onto the object 2605 will be described. In this case, the object 2601 becomes a transmitted object and the object 2605 becomes a receiving object as described above. Since the attribute of the transmitted object is photograph and the attribute of the receiving object is also a photograph, the processing proceeds to step S2813 through the processing described in the first embodiment. At step S2813, the processing proceeds to the receiving metadata link processing of FIG. 39.

Figure 39:
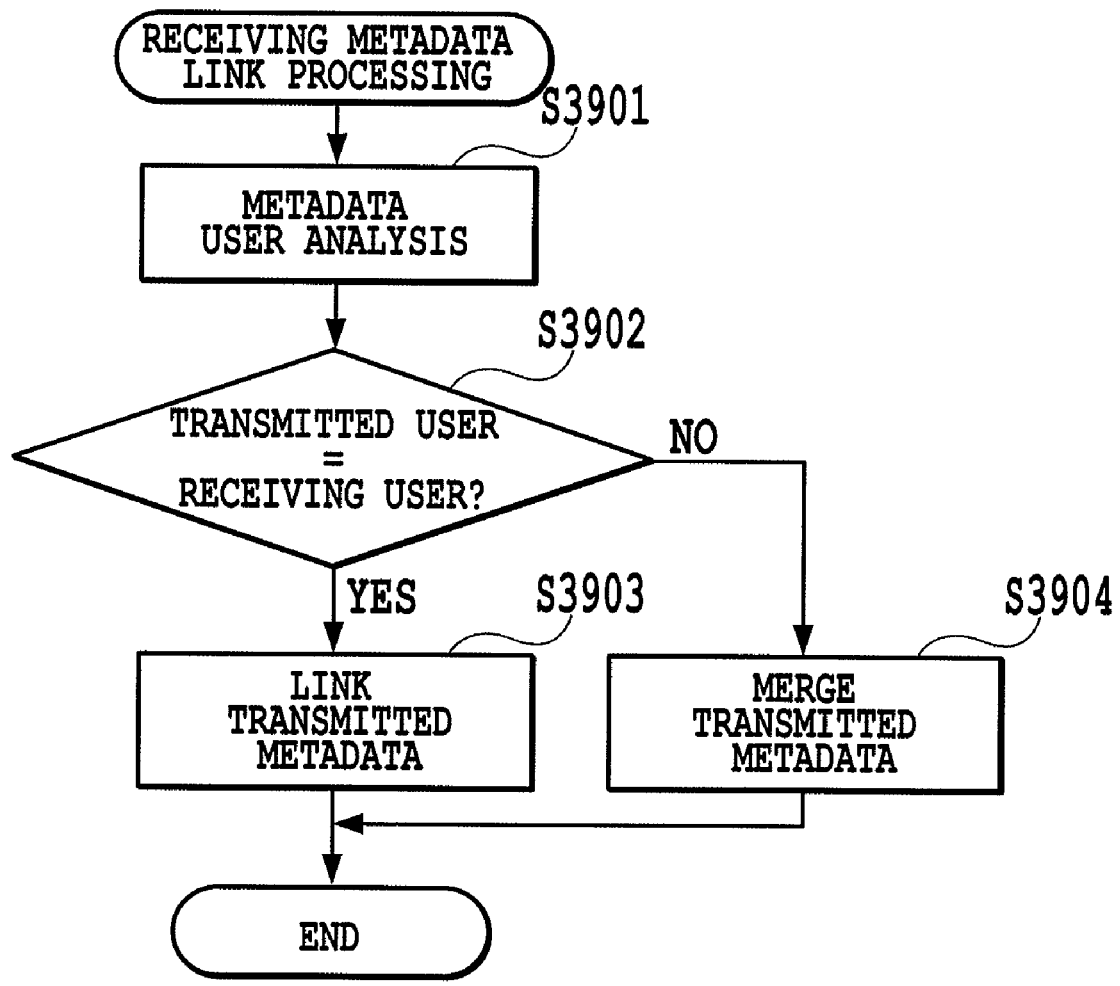
FIG. 39 is a flowchart showing the metadata editing which will be described in the embodiment 2.

At step S3901 of FIG. 39, the user information is obtained from the metadata 2701 of the transmitted object 2601 as a transmitting user, and the user information is obtained from the metadata 2705 of the receiving object 2605 as a receiving user. Here, since the user information in the metadata 2701 is <user>USER1</user>, the transmitting user is USER1, and since the user information in the metadata 2705 is <user>USER1</user>, the receiving user is also USER1.

Next, at step S3902, a decision is made as to whether the transmitting user and the receiving user are identical. Since both the transmitting user and receiving user are USER1, the processing proceeds to step S3903.

At step S3903, the metadata 2605 is updated as designated by reference numeral 3401 of FIG. 34 by causing the receiving object to retain the metadata of the transmitted object as link information. To be concrete, as shown in the metadata 3401, the address indicating the link information to the transmitted object 2601 is retained as <link>ADDRESS1</link>. The term ADDRESS1, which indicates the metadata 2701 of the object 2601, consists of a directory and file name designating the metadata 2701 of the object 2601 stored in the BOX 111 within the MFP 100. In addition, when linking to an object saved outside the MFP 100, saved in the database 105, for example, it can include an IP address designating the position of the database 105 on the network.

Next, a case where the user drags and drops the object 3702 onto the object 2601 will be described. In this case, the object 3702 is a transmitted object and the object 2601 is a receiving object. Since the attribute of the transmitted object is photograph and the attribute of the receiving object is also a photograph, the processing proceeds to step 2813 through the processing described before. At step S2813, the processing proceeds to the receiving metadata link processing of FIG. 39.

At step S3901 of FIG. 39, the user information is obtained from the metadata 3802 of the transmitted object 3702 as a transmitting user, and the user information is obtained from the metadata 2701 of the receiving object 2601 as a receiving user. Here, since the user information in the metadata 3802 is <user>USER2</user>, the transmitting user is USER2, and since the user information in the metadata 2701 is <user>USER1</user>, the receiving user is USER1.

Next, at step S3902, a decision is made as to whether the transmitting user and the receiving user are identical. Since the transmitting user is USER2 and the receiving user is USER1, the processing proceeds to step S3904.

At step S3904, the metadata of the transmitted object is merged into the receiving object. In other words, the metadata 2701 of the object 2601 is updated as designated by the reference numeral 4001 of FIG. 40. It is found by comparing the metadata 4001 with the metadata 2701 that the metadata in the portion of <caption>digital single-lens reflex camera</caption> in the block 3802 is added in the metadata 4001.

In this way, when the first user edits the metadata between two photographic objects, as for the object that is likely to be prepared by the second user, associating of its metadata as the link information is avoided. Thus, even when the second user revises the metadata afterward, switching the editing operation by deciding the user of the object makes it possible to maintain the information at the time when the first user edits the metadata.

As described above, the image processing method of the present embodiment can add the metadata in such a manner as to facilitate editing of the metadata, to make it easier for the user to understand intuitively, and to facilitate reuse and search afterward.

Embodiment 3

In the first embodiment described above, the method of switching the merging method of the metadata in accordance with the attributes of the associated first and second objects is described. In addition, in the second embodiment, the method of switching the merging method of the metadata in accordance with the user information in the associated first and second objects is described. However, the metadata from which the switching originates is not limited to the attribute of the object or to the user information. Other information added as the metadata such as an area ID, the width of an object, height of the object, job class of the object, security level of the object, place, time or caption can also be used as the starting point of switching of the merging method.

The starting point of switching the merging method is not limited to a single point. By mixing the use of the attribute and user information on the objects as the starting point of switching the merging method, the merging method of the metadata can also be switched in accordance with the attribute and user information on the objects.

The merging methods are not limited to those described above in the first and second embodiments. It goes without saying that the user can customize any merging method individually as long as it can facilitate editing of the metadata, make it easier for the user to understand intuitively, and facilitate reuse and search afterward.

Embodiment 4

The present invention is applicable not only to a system comprising of a plurality of devices (such as a computer, interface unit, reader, and printer), but also to an apparatus consisting of a single device (such as a multifunction machine, printer or fax machine).

In addition, the object of the present invention can be achieved by reading, from a storage medium that stores program code for implementing the procedures of the flowcharts shown in the embodiments described above, the program code and executing it by a computer (or CPU or MPU) of the system or device. In this case, the program code itself read from the storage medium causes the computer to achieve the functions of the foregoing embodiments. Accordingly, the program code and a computer readable storage medium that stores/records the program code constitute an aspect of the present invention.

As the storage medium for supplying the program code, a floppy (registered trademark) disk, hard disk, optical disk, magneto-optical disk, CD-ROM, CD-R, magnetic tape, non-volatile memory card, ROM and the like can be used.

The functions of the foregoing embodiments can be achieved by reading and executing the program code with the computer. In addition, the term "execution of the program" includes the case where an OS and the like working on the computer performs part or all of the actual processing according to the instructions of the program code.

Furthermore, the functions of the foregoing embodiments can also be implemented by a function expansion board inserted into a computer or a function expansion unit connected to the computer. In this case, the program read out of the storage medium is written into a memory in the function expansion board inserted into the computer or in the function expansion unit connected to the computer. After that, according to the instructions of the program, the CPU in the expansion board or in the expansion unit performs part or all of the actual processing. The functions of the foregoing embodiments can also be implemented by the processing of such a function expansion board or a function expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-122561, filed May 8, 2008 which is hereby incorporated by reference herein in its entirety.

What is claimed is:

1. An image processing device comprising:
at least one processor;
an input component configured to input image data;
an object dividing component configured to divide the image data input by the input component into a plurality of objects;
a metadata adding component configured to add metadata to each object obtained by the object dividing component;
a selecting component configured to select, from the objects having metadata added by the metadata adding component, a first object and a second object which are editing targets of metadata;
a metadata analysis component configured to conduct analysis of the individual metadata of the first object and the second object selected by the selecting component to obtain an analysis result, wherein the analysis includes analysis of an individual attribute of the first object and the second object;
a deciding component configured to decide an update procedure of the metadata of the first object and the metadata of the second object, such that a metadata of an object whose attribute is text is added to a metadata of an object whose attribute is photograph, graphics or background, when one of the attribute of the first object and the attribute of the second object is text and one of the attribute of the first object and the attribute of the second object is photograph, graphics or background based on the analysis result of the metadata analysis component; and
an update component configured to update at least one of the metadata of the first object and the metadata of the second object in the update procedure decided by the deciding component,
wherein at least one of the components is implemented using at least one processor.

2. The image processing device as claimed in claim 1, further comprising an object association component configured to associate the first object with second object selected by the selecting component.

3. The image processing device as claimed in claim 2, wherein the object association component is configured to drag and drop the first object onto the second object.

4. The image processing device as claimed in claim 1, wherein the object dividing component divides the image data in accordance with attributes of text, photograph, graphics and background.

5. The image processing device as claimed in claim 1, wherein the metadata adding component provides each of the objects divided by the object dividing component with metadata designating an area ID of the object, an attribute of the object, width of the object, height of the object, a job class of the object, user information, a place, time and a caption.

6. The image processing device as claimed in claim 5, wherein the caption is, when the attribute of the object is a photograph or graphics, a character recognition result of an object closest to the object in its neighborhood, and when the attribute of the object is text, a character recognition result of the object.

7. The image processing device as claimed in claim 1, wherein the metadata analysis component is configured to analyze the metadata of the first object and the second object, and to output information about a target portion of the metadata added by the metadata adding component.

8. The image processing device as claimed in claim 1, wherein the update component updates the metadata about the first object, about the second object or about the first and second objects in accordance with the update procedure decided by the deciding component.

9. An image processing method executed by an image processing device, the image processing method comprising:
an input step of inputting image data;
an object dividing step of dividing the image data input at the input step into a plurality of objects;
a metadata adding step of adding metadata to each object obtained at the object dividing step;
a selecting step of selecting, from the objects having metadata added in the metadata adding step, a first object and a second object which are editing targets of metadata;
a metadata analysis step of conducting analysis of the individual metadata of the first object and the second object selected at the selecting step to obtain an analysis result, wherein the analysis includes analysis of an individual attribute of the first object and the second object;
a deciding step of deciding an update procedure of the metadata of the first object and the metadata of the second object, such that a metadata of an object whose attribute is text is added to a metadata of an object whose attribute is photograph, graphics or background, when one of the attribute of the first object and the attribute of the second object is text and one of the attribute of the first object and the attribute of the second object is photograph, graphics or background based on the analysis result at the metadata analysis step; and
an update step of updating at least one of the metadata of the first object and the metadata of the second object by the update procedure decided at the deciding step.

10. A non-transitory computer-readable recording medium having computer-executable instructions for performing an image processing method executed by an image processing device, the method comprising:

an input step of inputting image data;

an object dividing step of dividing the image data input at the input step into a plurality of objects;

a metadata adding step of adding metadata to each object obtained at the object dividing step;

a selecting step of selecting, from the objects having metadata added in the metadata adding step, a first object and a second object which are editing targets of metadata;

a metadata analysis step of conducting analysis of the individual metadata of the first object and the second object selected at the selecting step to obtain an analysis result, wherein the analysis includes analysis of an individual attribute of the first object and the second object;

a deciding step of deciding an update procedure of the metadata of the first object and the metadata of the second object, such that a metadata of an object whose attribute is text is added to a metadata of an object whose attribute is photograph, graphics or background, when one of the attribute of the first object and the attribute of the second object is text and one of the attribute of the first object and the attribute of the second object is photograph, graphics or background based on the analysis result of the metadata analysis step; and an update step of updating at least one of the metadata of the first object and the metadata of the second object by the update procedure decided at the deciding step.

* * * * *